United States Patent
Ryu et al.

(10) Patent No.: US 11,611,986 B2
(45) Date of Patent: Mar. 21, 2023

(54) CONTROL AND DATA MULTIPLEXING FOR RESOURCES

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Chester, NJ (US); Jelena Damnjanovic, Del Mar, CA (US); Mahmoud Taherzadeh Boroujeni, San Diego, CA (US); Ling Ding, Chester, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/097,624

(22) Filed: Nov. 13, 2020

(65) Prior Publication Data

US 2021/0212043 A1  Jul. 8, 2021

Related U.S. Application Data

(60) Provisional application No. 62/956,524, filed on Jan. 2, 2020.

(51) Int. Cl.
*H04W 72/04* (2009.01)
*H04W 8/18* (2009.01)
(Continued)

(52) U.S. Cl.
CPC .......... *H04W 72/20* (2023.01); *H04L 67/104* (2013.01)

(58) Field of Classification Search
CPC ............. H04W 88/02; H04W 72/1278; H04W 52/383; H04W 76/23; H04W 72/0406;
(Continued)

(56) References Cited

U.S. PATENT DOCUMENTS

| 2006/0206603 A1* | 9/2006 | Rajan | H04L 67/1097 709/223 |
| 2015/0049709 A1 | 2/2015 | Damnjanovic et al. | |

(Continued)

FOREIGN PATENT DOCUMENTS

EP   3352402 A1   7/2018

OTHER PUBLICATIONS

International Search Report and Written Opinion—PCT/US2020/060783—ISA/EPO—dated Apr. 6, 2021.

*Primary Examiner* — Wutchung Chu
*Assistant Examiner* — Jason A Harley
(74) *Attorney, Agent, or Firm* — Holland & Hart LLP

(57) ABSTRACT

Methods, systems, and devices for wireless communications are described. A set of user equipments (UEs) may communicate with each other on communication links using data resources from a pool of shared resources. The UEs may be configured to multiplex control resources with data resources of a shared resource pool. In some cases, a UE may communicate, in control resources, control signaling to reserve data resources of a shared resource pool. After transmitting the request, the UE may communicate data in one or more data resources. The UE may communicate the data using transmission components while concurrently processing control signaling using other components.

30 Claims, 11 Drawing Sheets

(51) Int. Cl.

| | |
|---|---|
| *H04W 76/28* | (2018.01) |
| *H04B 7/06* | (2006.01) |
| *H04B 7/08* | (2006.01) |
| *H04W 24/10* | (2009.01) |
| *H04W 72/12* | (2009.01) |
| *H04W 74/04* | (2009.01) |
| *H04W 72/20* | (2023.01) |
| *H04L 67/104* | (2022.01) |

(58) Field of Classification Search
CPC ..... H04W 92/18; H04W 28/26; H04W 72/02; H04W 24/10; H04W 72/04; H04W 74/0808; H04W 72/046; H04L 67/104
USPC .......................................... 370/329; 718/104
See application file for complete search history.

(56) References Cited

U.S. PATENT DOCUMENTS

| | | | |
|---|---|---|---|
| 2017/0034831 A1* | 2/2017 | Yerramalli | H04W 74/0808 |
| 2018/0049129 A1* | 2/2018 | Li | H04W 92/18 |
| 2018/0235002 A1* | 8/2018 | Son | H04W 74/08 |
| 2019/0110317 A1* | 4/2019 | Zhang | H04W 74/0808 |
| 2019/0188619 A1 | 6/2019 | Chaturvedi et al. | |
| 2021/0243814 A1* | 8/2021 | Zhang | H04W 74/0833 |

* cited by examiner

CONTROL AND DATA MULTIPLEXING FOR RESOURCES

CROSS REFERENCE

The present Application for Patent claims the benefit of U.S. Provisional Patent Application No. 62/956,524 by RYU et al., entitled "CONTROL AND DATA MULTIPLEXING FOR RESOURCES," filed Jan. 2, 2020, assigned to the assignee hereof, and expressly incorporated by reference herein.

FIELD OF TECHNOLOGY

The following relates generally to wireless communications and more specifically to control and data multiplexing for resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support control and data multiplexing for resources. Generally, the described techniques provide for enabling a base station to allocate shared resources to a set of user equipments (UEs) for peer-to-peer communications (e.g., sidelink communications). The UEs may perform beam training procedures to identify one or more characteristics or parameters (e.g., directional beams) on which to communicate with each other in the peer-to-peer network, and the UEs may communicate with each other on communication links using data resources from a pool of shared resources. To increase system efficiency and decrease interference, the UEs may dynamically reserve portions of shared resources to communicate. For example, and the UEs may communicate with each other to identify and decrease interference while making efficient use of available shared resources.

The UEs may be configured to multiplex control resources with data resources of a shared resource pool to increase system efficiency. That is, UEs may communicate data using one or more resources between portions of control resources in a control block. For example, a first UE may transmit, in control resources of a first set of shared resources, a request (e.g., a sidelink request, a request-to-send (RTS) message, etc.) to a second UE to reserve data resources of a second set of shared resources that occur after the first set of shared resources. After transmitting the request, the first UE may use a second control resource of the first set of shared resources to receive responses to the request to reserve data. Rather than being idle during resources that occur between the first control resource and the second control resource, the first UE may communicate data in one or more resources that occur between the first control resource and the second control resource. To permit scheduling of these data resources that can occur between control resources, the control resources may be interleaved with data resources in the first set of shared resources. In some cases, a control block that includes the signaling for scheduling UEs to use resources may be dispersed in the first set of shared resources. In some examples, the first UE may communicate the data in the first set of shared resources according to a schedule determined using control signaling in a previous set of shared resources. The first UE may communicate the data using transmission components while concurrently processing control messages using other components of the first UE. In some examples, the first UE may refrain from communicating data or control messages during a switch duration.

A method of wireless communications at a first UE is described. The method may include transmitting, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicating first data in a first one or more resources of the first set of shared resources after transmitting the request in the first control resource, receiving, by the first UE in a second control resource of the first set of shared resources, one or more responses from one or more UEs after communicating the request in the first one or more resources, and communicating second data in a second one or more resources of the first set of shared resources after receiving the one or more responses in the second control resource.

An apparatus for wireless communications at a first UE is described. The apparatus may include a processor, memory coupled with the processor, and instructions stored in the memory. The instructions may be executable by the processor to cause the apparatus to transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicate first data in a first one or more resources of the first set of shared resources after transmitting the request in the first control resource, receive, by the first UE in a second control resource of the first set of shared resources, one or more responses from one or more UEs after communicating the request in the first one or more resources, and communicate second data in a second one or more resources of the first set of shared resources after receiving the one or more responses in the second control resource.

Another apparatus for wireless communications at a first UE is described. The apparatus may include means for transmitting, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicating first data in a first one or more resources of the first set of shared resources after transmitting the request in the first control resource, receiving, by the first UE in a second control resource of the first set of shared resources, one or more responses from one or more UEs after communicating the request in the first one or more resources, and communicating second data in a second one or more resources of the first set of shared resources after receiving the one or more responses in the second control resource.

A non-transitory computer-readable medium storing code for wireless communications at a first UE is described. The code may include instructions executable by a processor to transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicate first data in a first one or more resources of the first set of shared resources after transmitting the request in the first control resource, receive, by the first UE in a second control resource of the first set of shared resources, one or more responses from one or more UEs after communicating the request in the first one or more resources, and communicate second data in a second one or more resources of the first set of shared resources after receiving the one or more responses in the second control resource.

Some examples of the method, apparatuses, and non-transitory computer-readable medium described herein may further include operations, features, means, or instructions for transmitting, to the second UE in a third control resource of the first set of shared resources, a confirmation indicating a reservation of the data resources in the second set of shared resources after communicating the second data in the second one or more resources, and communicating third data in a third one or more resources after transmitting the confirmation in the third control resource.

Some examples of the method, apparatuses, and non-transitory computer-readable medium described herein may further include operations, features, means, or instructions for identifying a switch duration for transitioning from using a first set of communication parameters to using a second set of communication parameters to communicate over the peer-to-peer network, where communicating the first data in the first one or more resources may be based on identifying the switch duration.

Some examples of the method, apparatuses, and non-transitory computer-readable medium described herein may further include operations, features, means, or instructions for refraining from communicating data or control information during a first duration corresponding to the switch duration in the first one or more resources, where communicating the first data in the first one or more resources may be based on refraining from communicating during the first duration.

Some examples of the method, apparatuses, and non-transitory computer-readable medium described herein may further include operations, features, means, or instructions for refraining from communicating data or control information in a second duration corresponding to the switch duration in the first one or more resources after communicating the first data, where receiving the one or more responses in the second control resource may be based on refraining from communicating during the second duration.

Some examples of the method, apparatuses, and non-transitory computer-readable medium described herein may further include operations, features, means, or instructions for refraining from communicating data or control information in a third duration corresponding to the switch duration in the second one or more resources, where communicating the second data after the third duration may be based on refraining from communicating during the third duration.

In some examples of the method, apparatuses, and non-transitory computer-readable medium described herein, the switch duration may be configured to allow the first UE to transition from receiving information to transmitting information, transition from transmitting information to receiving information, or adjust from first beam configuration parameters to second beam configuration parameters, or any combination thereof.

Some examples of the method, apparatuses, and non-transitory computer-readable medium described herein may further include operations, features, means, or instructions for receiving, from a base station, a message that indicates one or more resources in the first set of shared resources that may be allocated as control resources of the first set of shared resources and used for reserving the data resources.

Some examples of the method, apparatuses, and non-transitory computer-readable medium described herein may further include operations, features, means, or instructions for determining that the first control resource may be allocated for sending the request by the first UE based on receiving the message, where transmitting the request in the first control resource may be based on the determining that the first control resource may be allocated for sending the request by the first UE.

Some examples of the method, apparatuses, and non-transitory computer-readable medium described herein may further include operations, features, means, or instructions for determining that a fourth control resource may be allocated for sending a second request by a third UE based on receiving the message, and refraining, by the first UE, from communicating data in the fourth control resource based on determining that the fourth control resource may be allocated for sending the second request.

In some examples of the method, apparatuses, and non-transitory computer-readable medium described herein, the message indicates a numerical quantity of UEs in the peer-to-peer network associated with the first set of shared resources, an index value for each UE in the peer-to-peer network, a size of the first set of shared resources, a starting resource of control resources within the first set of shared resources, or a combination thereof.

Some examples of the method, apparatuses, and non-transitory computer-readable medium described herein may further include operations, features, means, or instructions for communicating the first data and the second data may be scheduled using one or more previous requests to reserve the data resources.

In some examples of the method, apparatuses, and non-transitory computer-readable medium described herein, communicating the first data may include operations, features, means, or instructions for communicating the first data with the second UE.

In some examples of the method, apparatuses, and non-transitory computer-readable medium described herein, communicating the first data may include operations, features, means, or instructions for communicating the first data with another UE of the set of UEs in the peer-to-peer network.

In some examples of the method, apparatuses, and non-transitory computer-readable medium described herein, communicating the first data may include operations, features, means, or instructions for transmitting the first data to another UE of the set of UEs in the peer-to-peer network.

In some examples of the method, apparatuses, and non-transitory computer-readable medium described herein, communicating the first data may include operations, features, means, or instructions for receiving the first data from another UE of the set of UEs in the peer-to-peer network.

In some examples of the method, apparatuses, and non-transitory computer-readable medium described herein, the first data may be scheduled using a request in a previous set of shared resources in response to an earlier confirmation associated with an earlier request, the previous set of shared resources being associated with a third period of time occurring before the first period of time associated with the first set of shared resources.

Some examples of the method, apparatuses, and non-transitory computer-readable medium described herein may further include operations, features, means, or instructions for transmitting the request in a first frequency bandwidth, and communicating the first data and the second data in a second frequency bandwidth greater than the first frequency bandwidth.

In some examples of the method, apparatuses, and non-transitory computer-readable medium described herein, the first one or more resources and the second one or more resources each include a same quantity of resources.

In some examples of the method, apparatuses, and non-transitory computer-readable medium described herein, the one or more responses indicate a positive response to the request, a negative response to the request, or both.

In some examples of the method, apparatuses, and non-transitory computer-readable medium described herein, the first control resource includes a first slot and the first one or more resources includes a first one or more slots.

In some examples of the method, apparatuses, and non-transitory computer-readable medium described herein, the peer-to-peer network includes a sidelink network for exchanging communications between the first UE and the second UE over one or more sidelink communication links.

DETAILED DESCRIPTION

Figure 1:
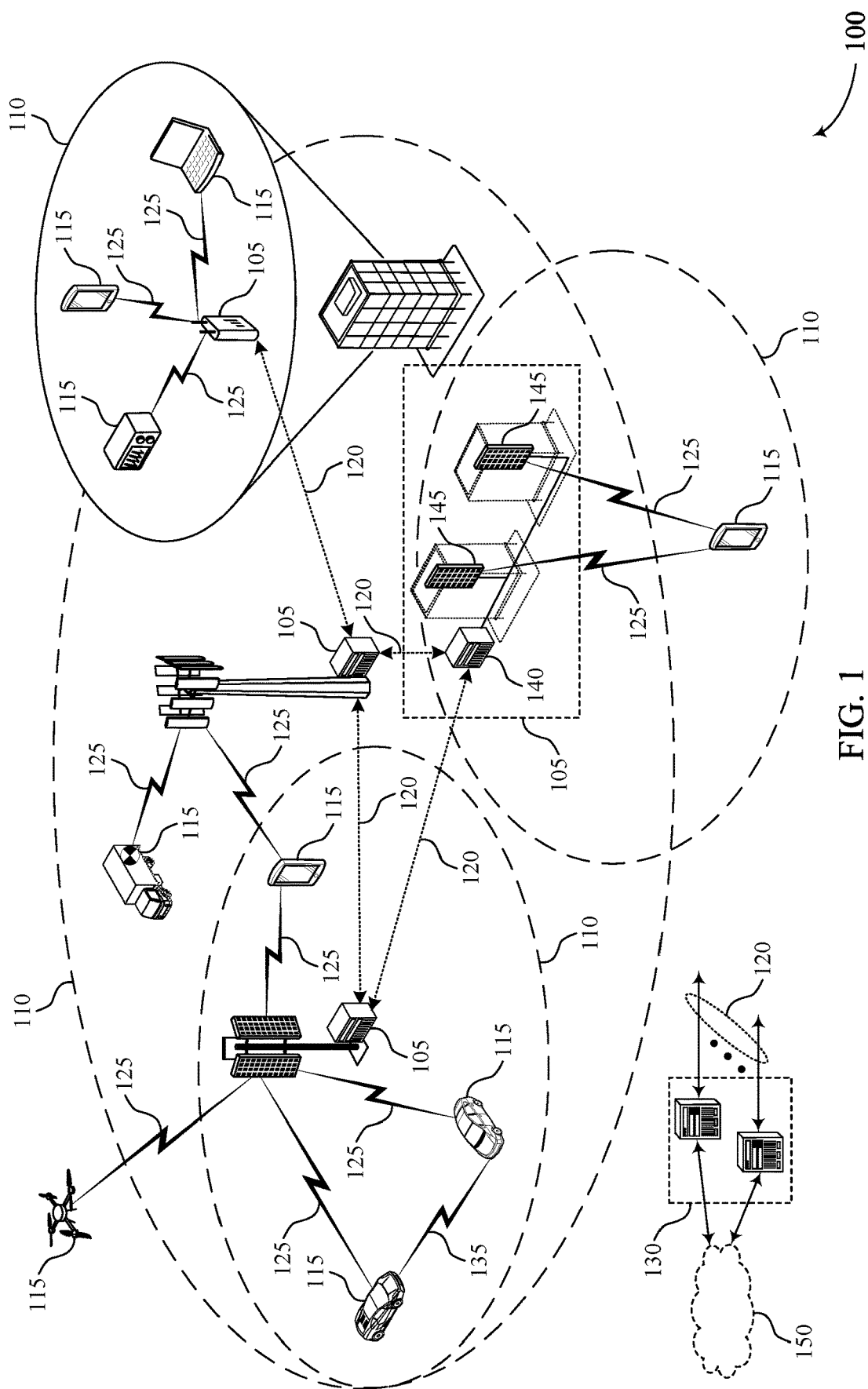
FIG. 1 illustrates an example of a wireless communications system that supports control and data multiplexing for resources in accordance with aspects of the present disclosure.

In some examples of a wireless communications system, a base station may allocate shared resources for peer-to-peer communications (e.g., sidelink communications, communications between user equipments (UEs), etc.). The UEs may perform beam training procedures to identify one or more characteristics or parameters (such as directional beams) on which to communicate with each other in a peer-to-peer network. The UEs may communicate with each other on communication links using resources, for example data resources, from a pool of shared resources. To increase system efficiency and decrease interference, the UEs may dynamically claim shared resources, for example according to a schedule, and may communicate with each other to identify and decrease interference while making efficient use of available shared resources.

A shared resource pool may, in some examples, include control resources and data resources. In some examples, a control block may be a plurality of control resources allocated to a single UE to schedule data resources in a subsequent set of shared resources. A set of shared resources may include one or more control blocks for one or more UEs. In some examples, the UEs may communicate with each other using the control resources of the shared resource pool to determine which UEs can claim and use data resources. The UEs may determine a priority schedule for transmitting and receiving control information. That is, over one or more control blocks in the control resources, a different UE may be scheduled to attempt to claim the data resources according to the priority schedule. Other UEs may be able to accept or object to the scheduling of data resources by the UE that is scheduled to claim the data resources. In some examples, one or more of the UEs may dynamically determine the priority schedule (e.g., a rotating schedule based on, for example, UE identifiers). In some examples, a base station may determine and indicate the priority schedule and communicate the priority schedule to one or more of the UEs.

In one or more control blocks, the control resources may be allocated for different types of signaling. A control block may have a duration of one or more transmission time intervals. In a first portion of the control block (e.g., in a first slot), the control resources may be allocated for transmission of a request by a first UE. The request may be, for example, a sidelink request-to-send (RTS) message. The request may request a reservation of data resources from a shared resource pool for a data transmission to a second UE that is a target UE. In some examples, a first UE that is scheduled, according to the priority schedule, to attempt to claim data resources may transmit a request to one or more other UEs (e.g., a target UE or another UE) over the first portion of the control block.

In a second portion of the control block (e.g., in a second slot), resources may be allocated for transmission of one or more response messages to the first UE that sent the request message. In some examples, a response message may include a clear-to-send (CTS) message. Various UEs that receive the request from the first UE may transmit one or more responses. The responses may indicate a positive response to the request (e.g., a positive response) or a negative response to the request (e.g., a negative response). For example, a second UE that is the target UE may transmit a positive response if it is available for a data transmission on the indicated subset of the data resources, or alternatively may refrain from transmitting a positive response if it is not available for the data transmission, among other examples.

In some examples, a third UE that may be a UE that is not the target of the first UE's request may transmit a negative response if it objects to a data transmission on the subset of the data resources for one or more reasons. Alternatively, the third UE may refrain from transmitting a negative response if it has no objection to a data transmission on the subset of the data resources, among other examples. In a third portion of the control block (e.g., in a third slot), resources may be allocated for a confirmation from the first UE that transmitted the request. The confirmation may indicate a reservation of the data resources requested in the request.

In some examples, one or more resources (e.g., one or more time resources, such as one or more slots) may be positioned after each portion (i.e., the first portion, the second portion, and the third portion) to enable the UEs to process the received signals. The one or more resources may also include a switch duration. The switch duration may correspond to a duration in which a UE may transition from one communication configuration to another communication configuration. For example, after transmitting the request, the first UE may transition from a transmission mode to a reception mode in order to receive one or more responses from other UEs. The switch duration may also enable the UEs to adjust beam configuration parameters for subsequent communications between the UEs. In some examples, the switch duration may be significantly less than a duration corresponding to the one or more resources. Accordingly, in some examples, transmission components (e.g., one or more antennas) of the UEs may be idle for a significant portion of the one or more resources, which may result in system inefficiency.

According to the techniques described herein, UEs may be configured to multiplex control blocks with data resources of a shared resource pool to increase system efficiency. That is, in one or more resources between portions of the control block allocated for transmitting and receiving control signaling, the UEs may be configured to communicate data (e.g., transmit and/or receive data) between the UEs. For example, a first UE may transmit a request (e.g., a sidelink RTS message) to a second UE to reserve data resources of a subsequent shared resource pool. The first UE may transmit the request in a first control resource of a control block allocated to the first UE to attempt to claim data resources. After transmitting the request, the first UE may communicate data in one or more resources. In some examples, the first UE may communicate the data according to a schedule based on previous requests to reserve data in a previous shared resource pool. In some examples, communicating the data may include collecting and storing radio frequency (RF) samples of data transmissions. The first UE may communicate the data using transmission components while concurrently processing control messages using other components of the first UE. That is, the first UE may communicate the data and process the control messages in parallel, which may enable increased system efficiency. Similarly, the first UE may communicate data in one or more resources following a second control resource allocated for receiving responses to the request to reserve data, and in one or more resources following a third control resource allocated for transmitting a confirmation corresponding to the request.

In some examples, the first UE may refrain from communicating data or control messages during a switch duration, which may enable the first UE and other UEs to configure transmission parameters between communications. In some examples, the switch duration may be a duration configured by a base station.

Particular aspects of the subject matter described herein may be implemented to realize one or more advantages. The described techniques may support increased efficiency, increased power savings, and improved user experience, among other benefits. The described techniques may also support improvements in system efficiency based on improved resource usage. As such, supported techniques may include improved network operations and, in some examples, may promote device and network efficiencies, among other benefits.

Aspects of the disclosure are initially described in the context of wireless communications systems and resource allocation schemes. Aspects of the disclosure are further illustrated by and described with reference to apparatus diagrams, system diagrams, and flowcharts that relate to control and data multiplexing for resources.

FIG. 1 illustrates an example of a wireless communications system 100 that supports control and data multiplexing for resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may allocate shared resources to a set of UEs 115 for peer-to-peer communications (e.g., sidelink communications). The UEs 115 may perform beam training procedures to identify one or more characteristics or parameters (e.g., directional beams) on which to communicate with each other, and the UEs 115 may communicate with each other on communication links using data resources from a pool of shared resources. In order to increase system efficiency and decrease interference, the UEs 115 may dynamically claim shared resources, for example according to a schedule, and may communicate with each other to identify and decrease interference while making efficient use of available shared resources.

The UEs 115 may be configured to multiplex control resources with data resources of a shared resource pool to increase system efficiency. That is, in one or more resources between portions of the control block allocated for transmitting and receiving control signaling, the UEs 115 may be configured to communicate data (e.g., transmit and/or receive data) between the UEs 115. For example, a first UE 115 may transmit a request (e.g., a sidelink RTS message) to a second UE 115 to reserve data resources of a subsequent shared resource pool. The first UE 115 may transmit the request in a first control resource of a control block allocated to the first UE 115 to attempt to claim data resources. After transmitting the request, the first UE 115 may communicate data in one or more resources between transmitting the request message and receiving one or more response messages. In some examples, the first UE 115 may communicate the data according to a schedule based on previous requests to reserve data in a previous shared resource pool. The first UE 115 may communicate the data using transmission components while concurrently processing control messages using other components of the first UE 115. Similarly, the first UE 115 may communicate data in one or more resources following a second control resource allocated for receiving responses to the request to reserve data, and in one or more resources following a third control resource allocated for transmitting a confirmation corresponding to the request. In some examples, the first UE 115 may refrain from communicating data or control messages during a switch duration.

Figure 2:
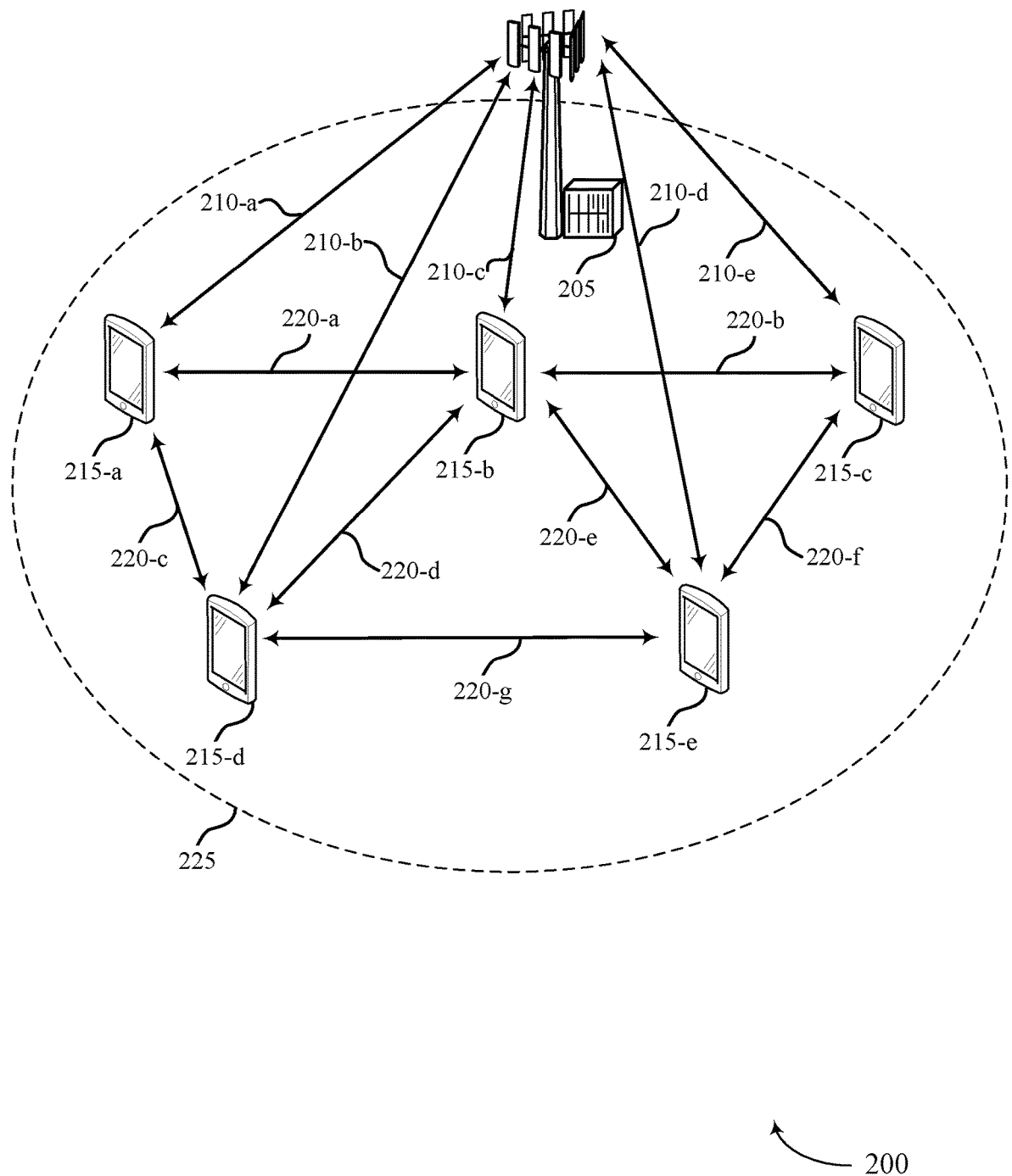
FIG. 2 illustrates an example of a wireless communications system that supports control and data multiplexing for resources in accordance with aspects of the present disclosure.

FIG. 2 illustrates an example of a wireless communications system 200 that supports control and data multiplexing for resources in accordance with aspects of the present disclosure. In some examples, the wireless communications system 200 may implement aspects of wireless communications system 100. For example, the wireless communications system 200 may include a base station 205 and UEs 215, which may be examples of the corresponding devices described with reference to FIG. 1.

The base station 205 may serve one or more UEs 215 located within a geographic area 225. For example, the base station 205 may serve the UE 215-a, the UE 215-b, the UE 215-c, the UE 215-d, or the UE 215-e. One or more groups of UEs 215 may participate in a peer-to-peer network (e.g., a sidelink network) that communicates data directly between UEs 215 while reducing involvement from the base station 205. The UEs 215 may communicate with each other via one or more connections 220 (e.g., the connection 220-a, the connection 220-b, the connection 220-c, the connection 220-d, the connection 220-e, the connection 220-f, or the connection 220-g). In some examples, the connections 220 may be sidelink connections, or peer-to-peer connections, or both. The base station 205 may communicate with the UEs 215 via one or more bidirectional communication links 210 (e.g., the bidirectional communication link 210-a, the bidirectional communication link 210-b, the bidirectional communication link 210-c, the bidirectional communication link 210-d, or the bidirectional communication link 210-e).

In some examples, the base station 205 may allocate resources (e.g., shared resources) to the UEs 215 to be used by a group of UEs that have established a peer-to-peer network. For example, the base station 205 may allocate the resources to the UEs 215 via one or more of the bidirectional communication links 210. The shared resources may include data resources and control resources in some examples. The UEs 215 may communicate with each other (e.g., via sidelink connections 220) to claim at least some of the shared data resources. The UEs 215 may split the shared data resources (e.g., dynamically or as indicated by one or more other devices such as the base station 205) into sub-pools, where each sub-pool may be shared, may be different in size, or both, among other differences or similarities. In some examples, a UE 215 may claim a sub-pool of the shared data resources. The base station 205 may restrict the UEs 215 from claiming the entirety of a pool of shared resources and may permit the UEs 215 to claim one or more sub-pools (e.g., an overall subset) of the shared resources.

The UEs 215 may determine a priority schedule, which may determine an order in which the UEs 215 may take turns attempting to claim data resources. The UEs 215 may communicate with each other, autonomously (e.g., without formal scheduling by the base station 205), using control resources according to the priority schedule. In some examples, the base station 205 may transmit, to the UEs 215, an indication of the priority schedule. In some examples, the UEs 215 may dynamically determine the priority schedule (e.g., without receiving an indication of the priority schedule from the base station).

The control resources may include resources allocated for signal types. For example, the UEs 215 may determine (e.g., via preconfigured information or signaling from the base station 205) resources for request messages, positive response and negative response messages, and confirmation messages. A set of shared resources may include a group of control blocks that include one or more control blocks. Each control block may include one or more control resources allocated to a single UE for the single UE to schedule future data resources of a subsequent set of shared resources. Each control block in the set of shared resources may include resources for one or more of a request message, a positive response message, a negative response message, or a confirmation. A UE 215 that is scheduled, according to the priority schedule, for a particular control block may transmit a request message to a target UE 215 over a control resource. The request message may indicate that the UE 215 intends to transmit a data message over a portion of the shared resources.

If a UE 215 (e.g., the UE 215-b) was scheduled to communicate a data transmission over a portion of the data resources requested by the request message, then that UE 215 may have priority and may be able to object to the request. For instance, the UE 215-d may be scheduled according to the priority schedule, and may transmit a request message to the UE 215-e. The UE 215-e may receive the request message. If the UE 215-e is available for the transmission, the UE 215-*e* may transmit a positive response message. However, the UE 215-*b* may receive the request message and may determine that a data transmission from the UE 215-*d* to the UE 215-*e* may interfere with a data transmission previously scheduled by the UE 215-*b*. In such examples, the UE 215-*b* may transmit a negative response message. The UE 215-*d* may receive the negative response message, and may determine to abort or refrain from transmitting the data transmission to the UE 215-*e*. In some cases, the UE 215-*b* may transmit the negative response message because the UE 215-*b* is a higher priority UE 215 than the UE 215-*d*.

The UEs 215 may be configured to multiplex control resources with data resources of a shared resource pool to increase system efficiency. That is, in one or more resources between portions of the control block allocated for transmitting and receiving control signaling, the UEs 215 may be configured to communicate data (e.g., transmit and/or receive data) between the UEs 215. For example, the UE 215-*a* may transmit a request (e.g., a sidelink RTS message) to UE 215-*b* to reserve data resources of a subsequent shared resource pool. The UE 215-*a* may transmit the request in a first control resource of a control block allocated to the UE 215-*a* to attempt to claim data resources. After transmitting the request, the UE 215-*a* may communicate data in one or more resources of the control block. In some examples, the UE 215-*a* may communicate the data according to a schedule based on previous requests to reserve data resources in a previous shared resource pool. The UE 215-*a* may communicate the data using transmission components while concurrently processing control messages using other components of the UE 215-*a*. Similarly, the UE 215-*a* may communicate data in one or more resources following a second control resource allocated for receiving responses to the request to reserve data, and in one or more resources following a third control resource allocated for transmitting a confirmation corresponding to the request. In some examples, the UE 215-*a* may refrain from communicating data or control messages during a switch duration.

Figure 3:
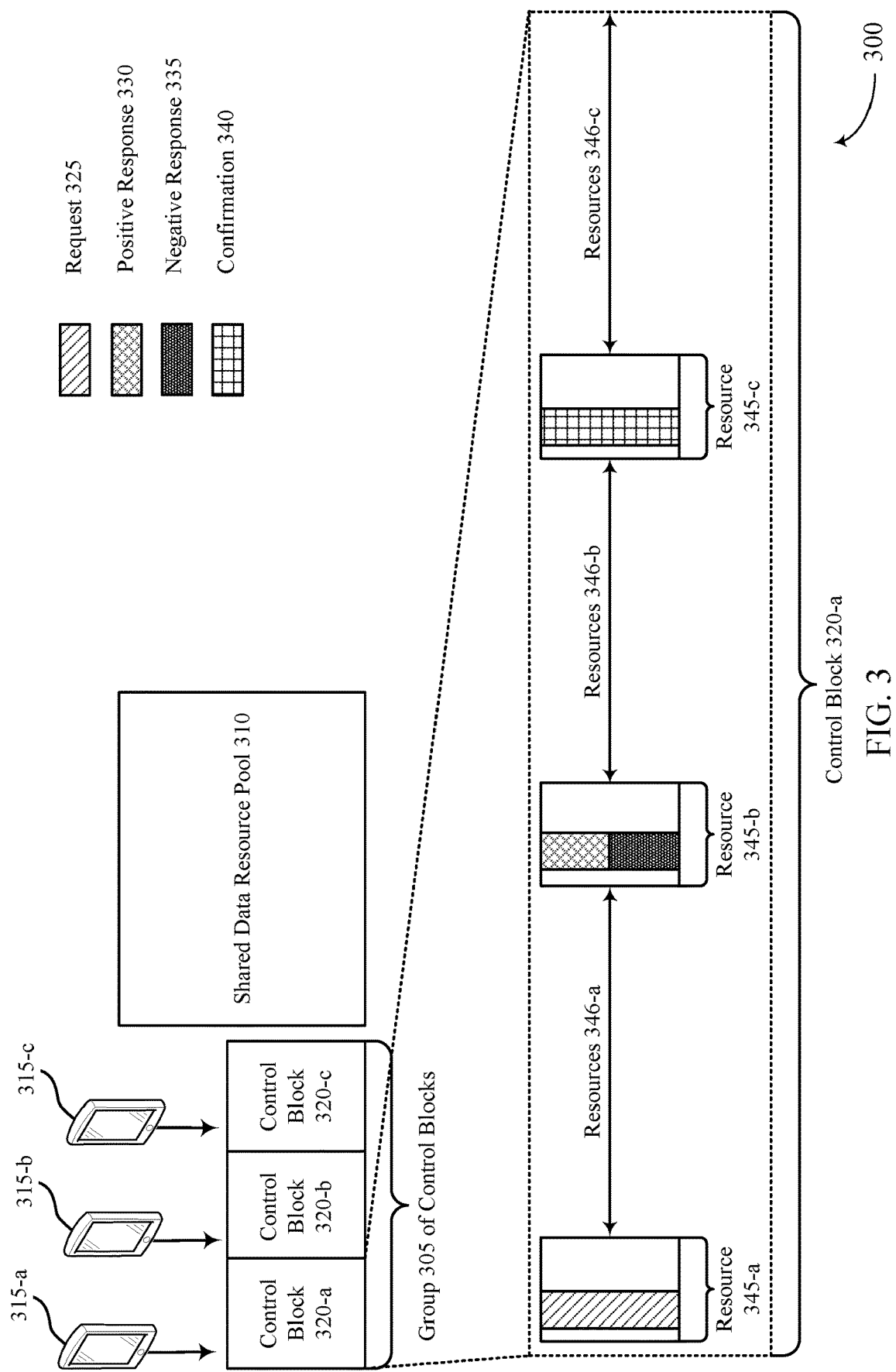
FIG. 3 illustrates an example of a resource allocation scheme that supports control and data multiplexing for resources in accordance with aspects of the present disclosure.

FIG. 3 illustrates an example of a resource allocation scheme 300 that supports control and data multiplexing for resources in accordance with aspects of the present disclosure. In some examples, resource allocation scheme 300 may implement aspects of wireless communications systems 100 and 200. The resource allocation scheme 300 may be associated with communications between UEs 315, which may be examples of corresponding devices described with reference to FIGS. 1 and 2. The resource allocation scheme 300 may illustrate features for improved UE peer-to-peer communications, among other benefits.

In some examples, multiple UEs 315 may communicate with each other (e.g., via one or more sidelink connections). A base station 105 may allocate shared resources to one or more of the UEs 315. The shared resources may include control resources and data resources. The control resources may be part of a group 305 of control blocks and the data resources may be part of a shared data resource pool 310. The UEs 315 may determine which UE 315 will transmit and receive in the shared data resource pools 310 without additional signaling from a base station 105. The UEs 315 may perform beam training procedures to determine which transmit and receive beams to use for communicating with each other. The UEs 315 may utilize these beams while transmitting control signals.

The UEs 315 may communicate with each other using the control blocks 320 to claim data resources from the shared data resource pool 310. The group 305 may include one or more control blocks 320. Each control block 320 may have a duration (e.g., one or more slots). Each control block 320 may include control resources 345 (e.g., time resources, slots, etc.) allocated for communicating different types of control signals. For example, the control block 320-*a* may include a resource 345-*a* allocated for transmitting a request 325 (e.g., an RTS message, a sidelink request, etc.), a resource 345-*b* allocated for monitoring for positive responses 330 and/or negative responses 335 (e.g., a positive or negative CTS message), and a resource 345-*c* allocated for transmitting a confirmation 340.

A requesting UE 315 may transmit a request 325 to a target UE 315 to claim data resources for data transmissions. A request 325 may include a UE identifier for the target UE 315. The other UEs 315 may monitor for the request 325 (e.g., to determine whether the other UEs 315 are the target UE 315 or to determine if a data transmission associated with the request 325 will cause interference above a threshold to a previously scheduled data transmission). The target UE 315 may transmit a positive response 330 in response to the request 325 to accept a data transmission. The target UE 315 may transmit a positive response 330 if it determines that it is not already scheduled to receive a data transmission or if a higher priority transmission will not cause interference above a threshold, among other examples. A non-target UE 315 may transmit a negative response 335 in response to the request 325 to object to a data transmission between the requesting UE 315 and the target UE 315. The non-target UE 315 may transmit a negative response 335, for example, if a data transmission from the requesting UE 315 will interfere with a previously scheduled data transmission for the non-target UE 315. A positive response 330 and a negative response 335 may overlap time resources (e.g., within the resource 345-*b*) and may occupy different frequency tones.

The requesting UE 315 may transmit a confirmation 340 to confirm a scheduled data transmission or may refrain from transmitting a confirmation 340 to indicate that a data transmission has been aborted or refrained from being performed. In some examples, if the requesting UE 315 receives a positive response 330 from the target UE 315 and no negative responses 335, then the requesting UE 315 may transmit the confirmation message 340. In some examples, if the requesting UE 315 does not receive a positive response 330 from the target UE 315, or if the requesting UE 315 receives one or more negative responses 335 from one or more other UEs 315, (or if both occur), then the requesting UE 315 may refrain from transmitting the confirmation 340.

The UEs 315 may take turns, according to the priority schedule, attempting to claim data resources of the shared data resource pool 310 during corresponding control blocks 320. At least some, if not all, of the UEs 315 may be aware of the priority schedule, and may thus monitor, transmit, or receive, or any combination thereof, in the resources allocated for the control signals of respective control blocks. In some examples, a base station 105 may transmit a downlink indication of the priority schedule. For example, the priority schedule may indicate that the UE 315-*a* is assigned the control block 320-*a* of the group 305, the UE 315-*b* is assigned a control block 320-*b* of the group 305, and the UE 315-*c* is assigned a control block 320-*c* of the group 305. Each of the UEs 315 may attempt to claim data resources from the shared data resource pool 310 during a respective assigned control block 320. That is, during the control block 320-*a*, the UE 315-*a* may transmit a request 325, but UE 3125-*b* and UE 315-*c* may refrain from or may be prohibited from transmitting request messages in the control block 320-*a*. Similarly, the UE 315-*b* may transmit a request 325 during the control block 320-*b* and UE 315-*c* may transmit a request 325 during the control block 320-*c*. The same downlink indication of the priority schedule, or a new indication of a priority schedule, may indicate assignments for subsequent control blocks (not shown), or may include a pattern or set of rules for subsequent control blocks (e.g., a rotation schedule, a round robin rule, etc.). In some examples, the UEs 315 may determine the priority schedule without input from the base station 105. For example, the UEs 315 may dynamically determine the priority schedule based on UE identifiers associated with the UEs 315 (e.g., a rotating schedule based on the UE identifiers).

A UE 315 that is assigned a control block 320 that is earlier than another control block 320 may have a higher priority than a UE 315 that is assigned to a later control block 320. That is, the UE 315-*a* may have a higher priority than the UE 315-*b*, and if the UE 315-*a* schedules a transmission during the control block 320-*a*, then the UE 315-*a* or a UE 315 scheduled to communicate with the UE 315-*a* may object to a request 325 by the UE 315-*b* transmitted during the control block 320-*b*.

The UEs 315 may attempt to claim data resources from the shared data resource pool 310 according to the priority schedule. For example, the UE 315-*a* may transmit, according to the priority schedule, a request 325 in the resource 345-*a* of the control block 320-*a*. The UE 315-*a* may transmit the request 325 to a target UE 315 (e.g., the UE 315-*c*). In some examples, the UE 315-*b* and the UE 315-*c* may direct respective receive beams toward the UE 315-*a* based on the priority schedule, among other factors. The UE 315-*c* may receive the request in the resource 345-*a* of the control block 320-*a* and may transmit a positive response 330 in the resource 345-*b* of the control block 320-*a*. The UE 315-*b* may also receive the request in the resource 345-*a* of the control block 320-*a*. If the UE 315-*b* determines that it does not have a conflicting data transmission schedule, among other conditions, then the UE 315-*b* may refrain from transmitting a negative response 335 in the resource 345-*b* of the control block 320-*a*. In the resource 345-*c* of the control block 320-*a*, having received the positive response 330 from the UE 315-*c*, and having received no negative responses 335 from any of the other UEs 315 (such as the UE 315-*b*), the UE 315-*a* may transmit a confirmation 340 to the UE 315-*c*. The UE 315-*c* may thus be scheduled to receive a data transmission on a set or portion of data resources from the shared data resource pool 310 on the same receive beam on which it received the request 325 and the confirmation 340.

A UE 315 may determine, based on one or more beam training procedures, which one or more beams to use to communicate with other UEs 315. For instance, during a control block 320, if a UE 315 is not scheduled to receive any data transmissions, then it may monitor for a request 325 by training its receive beam on the UE 315 that is scheduled to transmit a request 325, for example, according to the priority schedule. That is, the UE 315-*b* and the UE 315-*c* may both direct their receive beams to receive a request 325 from the UE 315-*a*, for example during the control block 320-*a*, according to a previously performed beam training procedure. The UE 315-*b* and the UE 315-*c* may thus determine, by receiving the request 325 in the control block 320-*a*, whether each is the target UE 315.

If a UE 315 is already scheduled to receive a data transmission on a receive beam, then it may monitor for request messages 325 using that receive beam. For example, if the UE 315-*a* schedules the UE 315-*c* during the control block 320-*a* for a data transmission on a first receive beam, then the UE 315-*c* may monitor for subsequent request messages 325 over the control resources on the first receive beam. By monitoring for request messages 325 using the first receive beam, the UE 315-*c* may determine whether potential subsequently schedulable data transmissions will interfere with the previously scheduled data transmission using the first receive beam. The UE 315-*c* may determine whether to transmit a negative response 335 based on monitoring for request 325 on the first receive beam, among other actions.

Each control block 320 may additionally include resources 346 after each resource 345 to enable the UEs 315 to process the control signals. The resources 346 may also include a switch duration. The switch duration may correspond to a duration in which a UE 315 may transition from one communication configuration to another communication configuration. For example, after transmitting the request 325 in the resource 345-*a*, the UE 315-*a* may transition from a transmission mode to a reception mode in order to receive responses (e.g., positive responses 330 and/or negative responses 335) from other UEs 315 in the resource 345-*b*. The switch duration may also enable the UEs 315 to adjust beam configuration parameters for subsequent communications between the UEs 315. In some examples, the switch duration may be significantly less than a duration corresponding to the resources 346 (e.g., the resources 346-*a*, the resources 346-*b*, or the resources 346-*c*).

The UEs 315 may be configured to multiplex the control resources with data resources of a shared data resource pool to increase system efficiency. Such techniques may be used to avoid situations where the UEs 315 are idle for a significant portion of the resources 346, which may result in system inefficiency. For example, the control resources may be included in a previous shared data resource pool preceding the shared data resource pool 310. Based on the multiplexing configuration, the UEs 315 may be configured to communicate data in the resources 346 between resources 345 of the control block 320 allocated for transmitting and receiving control signaling (e.g., in the resources 346-*a* between the resource 345-*a* and the resource 345-*b*). In some examples, the UEs 315 may communicate the data according to a schedule based on previous requests to reserve data in the previous shared data resource pool (i.e., the shared data resource pool multiplexed with the control resources). The UEs 315 may communicate the data using transmission components while concurrently processing control messages using other components of the UEs 315. In some examples, the UEs 315 may refrain from communicating data or control messages during a switch duration following and preceding each resource 345.

Figure 4:
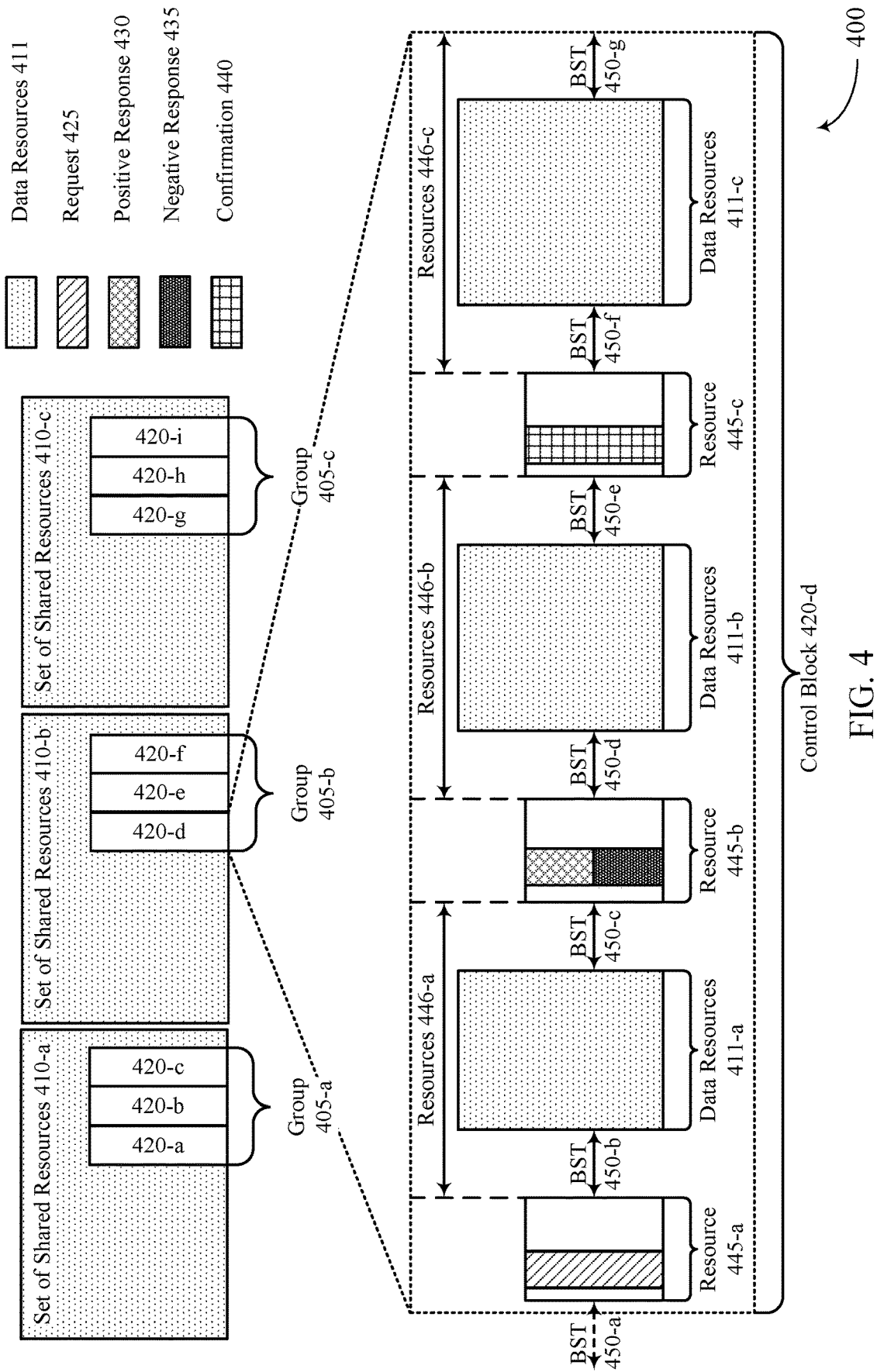
FIG. 4 illustrates an example of a resource allocation scheme that supports control and data multiplexing for resources in accordance with aspects of the present disclosure.

FIG. 4 illustrates an example of a resource allocation scheme 400 that supports control and data multiplexing for resources in accordance with aspects of the present disclosure. In some examples, resource allocation scheme 400 may implement aspects of wireless communications systems 100 and 200. The resource allocation scheme 400 may be associated with communications between UEs, which may be examples of corresponding devices described with reference to FIGS. 1 and 2. The resource allocation scheme 400 may illustrate features for improved UE peer-to-peer communications, among other benefits.

Multiple UEs may communicate with each other directly over a peer-to-peer network (e.g., via one or more sidelink connections). A base station may allocate one or more sets of shared resources 410 to the UEs to use as part of the peer-to-peer network. The shared resources 410 may include control resources 445 and data resources 411. Control resources 445 may be multiplexed with data resources 411 in each set of shared resources 410. The UEs may determine which UE will transmit and receive in the data resources of the set of shared resources 410 without additional signaling from a base station. The UEs may perform beam training procedures to determine which transmit and receive beams to use for communicating with each other. The UEs may utilize these beams while transmitting control signals.

The UEs may communicate with each other on groups 405 of control blocks 420 to claim data resources 411 from the set of shared resources 410. For example, the UEs may use the group 405-*a* of control blocks 420 to claim data resources 411 from the second set of shared resources 410-*b*, and the UEs may use the group 405-*b* of control blocks 420 to claim data resources 411 from the third set of shared resources 410-*c*. The groups 405 may include one or more control blocks 420. Each control block 420 may have a duration (e.g., one or more slots). Each control block 420 may include resources 445 (e.g., time resources, slots, etc.) allocated for communicating different types of control signals. For example, the control block 420-*d* may include a resource 445-*a* allocated for transmitting a request 425 (e.g., an RTS message, a sidelink request, etc.), a resource 445-*b* allocated for monitoring for positive responses 430 and/or negative responses 435 (e.g., a positive or negative CTS message), and a resource 445-*c* allocated for transmitting a confirmation 440. In some examples, a control signal may not occupy all the resources (e.g., time resources or frequency resources or a combination thereof) of a resource 445.

Each control block 420 may additionally include a duration corresponding to resources 446 after each resource 445 to enable the UEs to process the control signals. In some examples, the quantity of time resources (e.g., the quantity of slots) in the resources 446 may vary. In other examples, the quantity of time resources in each set of resources 446 may be the same. The duration corresponding to the resources 446 may include a switch duration, such as a beam switch time (BST) 450. The switch duration may be configured to allow a UE to switch between transmitting and receiving, switch beam configurations for one or more direction beams (e.g., whether a transmit beam or a receive beam), or a combination thereof. In some examples, the BST 450 may be significantly less than a duration corresponding to the resources 446 (e.g., the resources 446-*a*, the resources 446-*b*, or the resources 446-*c* of the control block 420-*d*). Accordingly, in some examples, transmission components (e.g., one or more antennas) of the UEs may be idle for a significant portion of the resources 446, which may result in system inefficiency.

Based on the multiplexing configuration for the control resources 445 and the data resources 411, UEs may be configured to communicate data on data resources 411 in the resources 446 to improve system efficiency. For example, in the control block 420-*d*, the UEs may communicate data on the data resources 411-*a* in the resources 446-*a*. In some examples, the UEs may communicate the data according to a schedule based on previous requests to reserve data in the second set of shared resources 410-*b* (e.g., based on requests communicated on the group 405-*a*). The UEs may communicate on the data resources 411 using transmission components while concurrently processing control messages (e.g., control messages received before the data resources 411) using other components of the UEs. In some examples, the data resources 411 may include a greater frequency bandwidth than the resources 445 allocated for transmitting control signals. In some examples, although the control resources 445 are multiplexed with the data resources 411, the UEs may refrain from communicating data on the resources 445 of the control blocks 420. The UEs may also refrain from communicating data in resources that may overlap time resources and occupy different frequency tones than the resources 445, to avoid interference between data transmissions and control signals.

As illustrated in FIG. 4, the groups 405 of control blocks 420 may be multiplexed with the data resources 411 such that the control blocks 420 are close (e.g., close in time) to the data resources 411 reserved by the control blocks 420. Accordingly, a channel environment for the control blocks 420 may be similar to a channel environment of the data resources 411 reserved by the control blocks 420.

A requesting UE (e.g., a UE assigned the control block 420-*d*) may transmit the request 425 in the resource 445-*a*. In some examples, such as when the control block 420-*d* is the first control block 420 of the group 405-*b*, the requesting UE may refrain from communicating during a BST 450-*a* preceding the resource 445-*a*. The requesting UE may transmit the request 425 to a target UE to claim data resources 411 for data transmissions in the third set of shared resources 410-*c*. In some examples, the other UEs (including the target UE) may direct respective receive beams toward the requesting UE based on the assignment of the control block 420-*d*, among other factors.

After transmitting the request 425 in the resource 445-*a*, the other UEs may process the request 425 in the duration corresponding to the resources 446-*a*. The requesting UE and the other UEs may refrain from communicating with one another during a BST 450-*b* after the resource 445-*a* and during a BST 450-*c* preceding the resource 445-*b*. The resources 446-*a* may also include data resources 411-*a*, in addition to the BST 450-*b* and the BST 450-*c*. UEs (e.g., the requesting UE, the target UE, and other UEs sharing allocated resources in the second set of shared resources 410-*b*) may communicate data on the data resources 411-*a* during the control block 420-*d*. The UEs may communicate the data on the data resources 411-*a* according to a schedule based on previous requests to reserve data in the second set of shared resources 410-*b* (e.g., based on requests communicated on the group 405-*a*).

The target UE may receive the request 425 in the resource 445-*a* of the control block 420-*d* and may transmit a positive response 430 in the resource 445-*b* of the control block 420-*d*. Non-target UEs may also receive the request in the resource 445-*a* of the control block 420-*d*. If a non-target UE determines that it does not have a conflicting data transmission schedule, among other conditions, then the non-target UE may refrain from transmitting a negative response 435 in the resource 445-*b* of the control block 420-*d*. In some examples, a positive response 430 and a negative response 435 may overlap time resources and may occupy different frequency tones in the resource 445-*b*.

After receiving the positive responses 430 and/or negative responses 435 in the resource 445-*b*, the requesting UE may process the responses in the duration corresponding to the resources 446-*b*. The requesting UE and the other UEs may refrain from communicating with one another during a BST 450-*d* after the resource 445-*b* and during a BST 450-*e* preceding the resource 445-*c*. The resources 446-*b* may also include data resources 411-*b*, in addition to the BST 450-*d* and the BST 450-*e*. The UEs may communicate data on the data resources 411-*b* during the control block 420-*d* according to the schedule based on previous requests to reserve data in the second set of shared resources 410-*b*.

In the resource 445-c of the control block 420-d, having received the positive response 430 from the target UE, and having received no negative responses 435 from any of the non-target UEs, the requesting UE may transmit a confirmation 440 to the target UE. The target UE may thus be scheduled to communicate a data transmission on a set of shared resources subsequent to the second set of shared resources 410-b (e.g., third set of shared resources 410-c or portion of data resources 411 in the third set of shared resources 410-c). In some cases, the scheduled data resources 411 in the third set of shared resources 410-c may be communicated on the same receive beam on which it received the request 425 and the confirmation 440.

After transmitting the confirmation 440 in the resource 445-c, the other UEs may process the confirmation 440 in the duration corresponding to the resources 446-c. The requesting UE and the other UEs may refrain from communicating with one another during a BST 450-f after the resource 445-c and during a BST 450-g preceding the end of the control block 420-d, where the end of the control block 420-d may correspond with the beginning of a control block 420-e. The resources 446-c may also include data resources 411-c, in addition to the BST 450-f and the BST 450-g. The UEs may communicate data on the data resources 411-c during the control block 420-d according to the schedule based on previous requests to reserve data in the second set of shared resources 410-b.

The multiplexed data and control communications may therefore support improvements in peer-to-peer communications between the UEs and, in some examples, may improve system efficiency, among other benefits.

Figure 5:
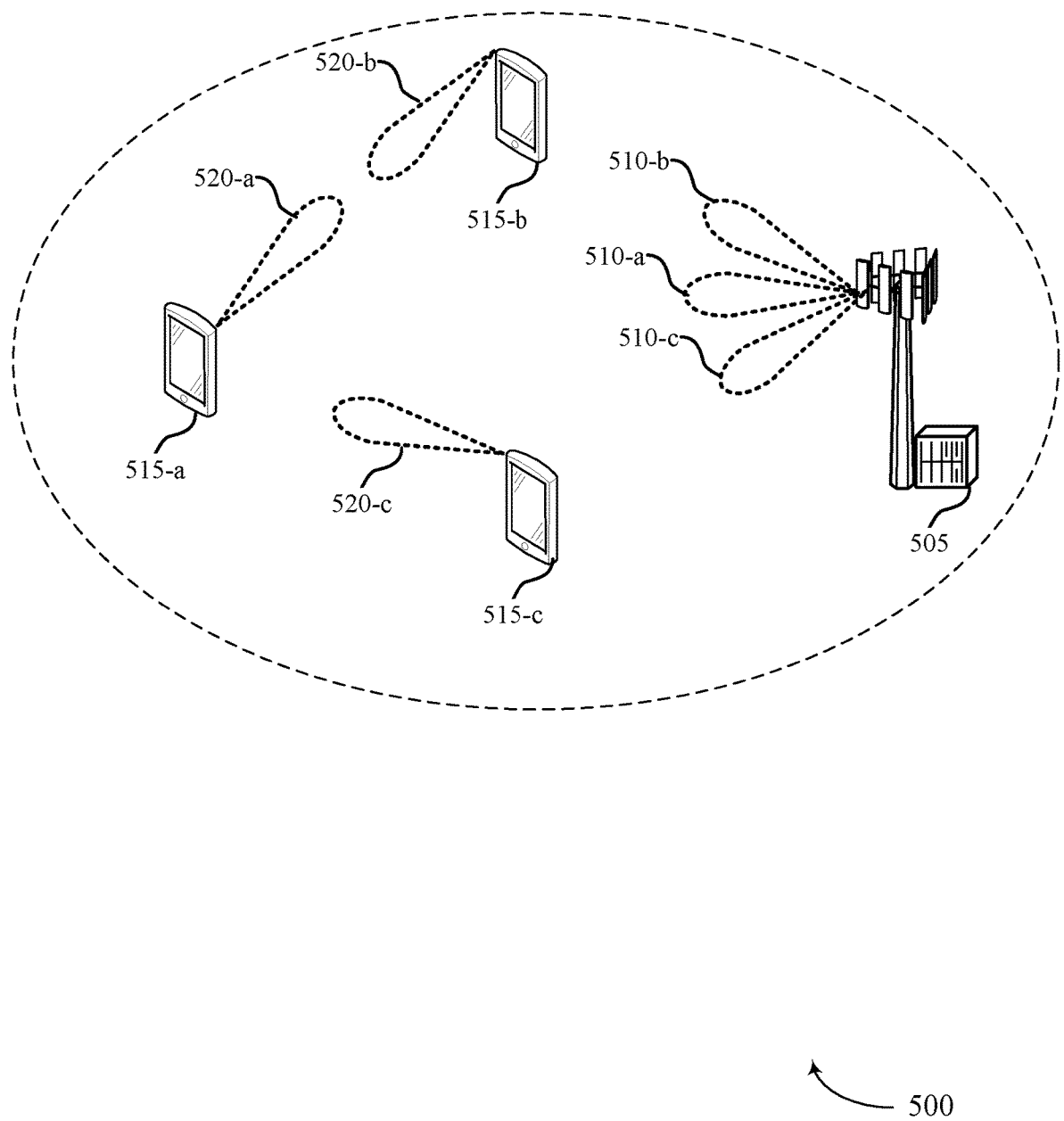
FIG. 5 illustrates an example of a wireless communications system that supports control and data multiplexing for resources in accordance with aspects of the present disclosure.

FIG. 5 illustrates an example of a wireless communications system 500 that supports control and data multiplexing for resources in accordance with aspects of the present disclosure. In some examples, wireless communications system 500 may implement aspects of wireless communications systems 100 and 200. For example, the wireless communications system 500 may include a base station 505 and UEs 515, which may be examples of the corresponding devices described with reference to FIGS. 1 and 2. The wireless communications system 500 may illustrate features for improved UE peer-to-peer communications, among other benefits. The wireless communications system 500 may implement one or more aspects of the resource allocation scheme 400 described with reference to FIG. 4.

In some examples, the base station 505 may communicate with one or more of the UEs 515. The base station 505 may transmit downlink signals on one or more beams 510. For example, the base station 505 may communicate with the UE 515-a on the beam 510-a, may communicate with the UE 515-b on the beam 510-b, and may communicate with the UE 515-c on the beam 510-c. In some examples, the base station 505 may allocate shared resources for communications among one or more of the UEs 515 (e.g., sidelink communications, peer-to-peer communications, etc.). The shared resources may include control resources, including multiple control blocks, and data resources, as described with reference to greater detail with respect to FIG. 3. The UEs 515 may identify a priority schedule that indicates which UE 515 may attempt to claim the data resources in each control block of the control resources. The base station 505 may transmit the priority schedule to the UEs 515, or alternatively the UEs 515 may determine the priority scheduled autonomously or based on a preconfigured priority schedule, among other examples. The UEs 515 may perform one or more beam training procedures, to identify which beams 520 to use for communicating with each other. For instance, the UE 515-b may determine which beam 520 to use to communicate with each of the UE 515-a and the UE 515-c. To communicate with the UE 515-a, the UE 515-b may use the beam 520-b to receive transmissions from the UE 515-a or transmit communications to the UE 515-a.

In some examples, the UEs 515 may use their beams 520 based on a priority schedule. For example, the UEs 515 may determine, according to a priority schedule, that the UE 515-a is scheduled to attempt to claim the data resources during a control block (e.g., in one or more slots in the control resources). Based on the priority schedule, the UE 515-b may use the beam 520-b to receive from the UE 515-a, to determine whether it is the target UE 515 of the UE 515-a. The UE 515-c may be available for data transmissions using the data resources (e.g., the UE 515-c may not have been scheduled previously by another UE 515). Thus, the UE 515-c may also use the beam 520-c to receive from the UE 515-a, to determine whether it is the target UE 515 of the UE 515-a.

The UE 515-a may attempt to schedule a data transmission to the UE 515-b. The UE 515-a may use the beam 520-a to communicate with the UE 515-b (e.g., based on the beam training procedure). In a first control resource of the control block (e.g., in a first slot), the UE 515-a may transmit to the UE 515-b, on the beam 520-a, a request to reserve a subset of the data resources. In some examples, the request may include an identifier, for example a UE 515 identifier, indicating which UE 515, such as the UE 515-b, is the target UE 515. The UE 515-b may receive the request on the beam 520-b and may determine that it is the target UE 515. If the UE 515-b does not have a conflicting transmission scheduled by another UE 515, among other alternative operations or conditions, and if the UE 515-b does not sense interference from another UE 515 on the beam 520-b above a threshold, then the UE 515-b may transmit, on the beam 520-b, a positive response (e.g., indicating a positive response to the request). The UE 515-c may also monitor for the request on the beam 520-c in the first control resource of the control block.

In some examples, (e.g., based on the direction of beam 520-a), the UE 515-c may not receive the request. In such examples, in a second control resource of the control block, the UE 515-c may refrain from transmitting a response (e.g., a negative response). In some examples, the UE 515-c may receive the request in the first control resource of the control block. In such examples, the UE 515-c may determine that it is not the target UE 515 (e.g., based on the UE 515 identifier included in the request). The UE 515-c may determine that it does not object to a data transmission from the UE 515-a on the beam 520-a (e.g., because the UE 515-c is not already scheduled to receive a data transmission in the subset of data resources or because a data transmission on the beam 520-a will not cause interference above a threshold for the UE 515-c). Upon determining that it does not object to a data transmission in the subset of data resources on the beam 520-a, the UE 515-c may refrain from transmitting a negative response to the UE 515-a on the beam 520-c in the second control resource of the control block.

The UE 515-a may determine whether to send a data transmission based on monitoring for responses from other UEs 515. For example, the UE 515-a may monitor for responses from the other UEs 515 in the second control resource of the control block on the beam 520-a. In some examples, the UE 515-a may receive the positive response from the UE 515-b, and may not receive a negative response from the UE 515-c.

Based on these responses, the UE 515-*a* may determine that the UE 515-*b* is available for a data transmission in the subset of the data resources, and that no other UEs 515 (e.g., the UE 515-*c*) object to the data transmission on the beam 520-*a*. In such examples, the UE 515-*a* may transmit a confirmation of the reservation of the subset of the data resources in a third control resource of the control block on the beam 520-*a* to the UE 515-*b*. The UE 515-*b* may receive the confirmation and may determine that the data transmission indicated in the request is confirmed. After the control resources that correspond to a set of data resources are over, the UE 515-*a* may transmit the data transmission to the UE 515-*b* using the reserved subset of the data resources. The UE 515-*b* may monitor for the data transmission using beam 520-*b* and may successfully receive the data transmission. The UE 515-*c* may also monitor for the confirmation on the beam 520-*c*. If the UE 515-*c* receives the confirmation, it may determine that the subset of the data resources is successfully reserved and may account for this information in one or more subsequent control blocks.

The UEs 515 may be configured to multiplex control blocks with data resources of a shared resource pool to increase system efficiency. That is, in one or more resources between portions of the control block allocated for transmitting and receiving control signaling, the UEs 515 may be configured to communicate data (e.g., transmit and/or receive data) between the UEs 515. For example, the UE 515-*a* may transmit a request (e.g., a sidelink RTS message) to the UE 515-*b* on the beam 520-*a* to reserve data resources of a subsequent shared resource pool. The UE 515-*a* may transmit the request in a first control resource of a control block allocated to the UE 515-*a* to attempt to claim data resources. After transmitting the request, the UE 515-*a* may communicate data in one or more resources of the control block. In some examples, the UE 515-*a* may communicate the data according to a schedule based on previous requests to reserve data in a previous shared resource pool. The UE 515-*a* may communicate the data using transmission components while concurrently processing control messages using other components of the UE 515-*a*. Similarly, the UE 515-*a* may communicate data in one or more resources following a second control resource allocated for receiving responses to the request to reserve data, and in one or more resources following a third control resource allocated for transmitting a confirmation corresponding to the request. In some examples, the UE 515-*a* may refrain from communicating data or control messages during a switch duration. The switch duration may correspond to a duration in which the UE 515-*a* may transition from one communication configuration to another communication configuration. For example, the UE 515-*a* may transition from transmitting on the beam 520-*a* to communicating on another beam 520 (not shown).

Figure 6:
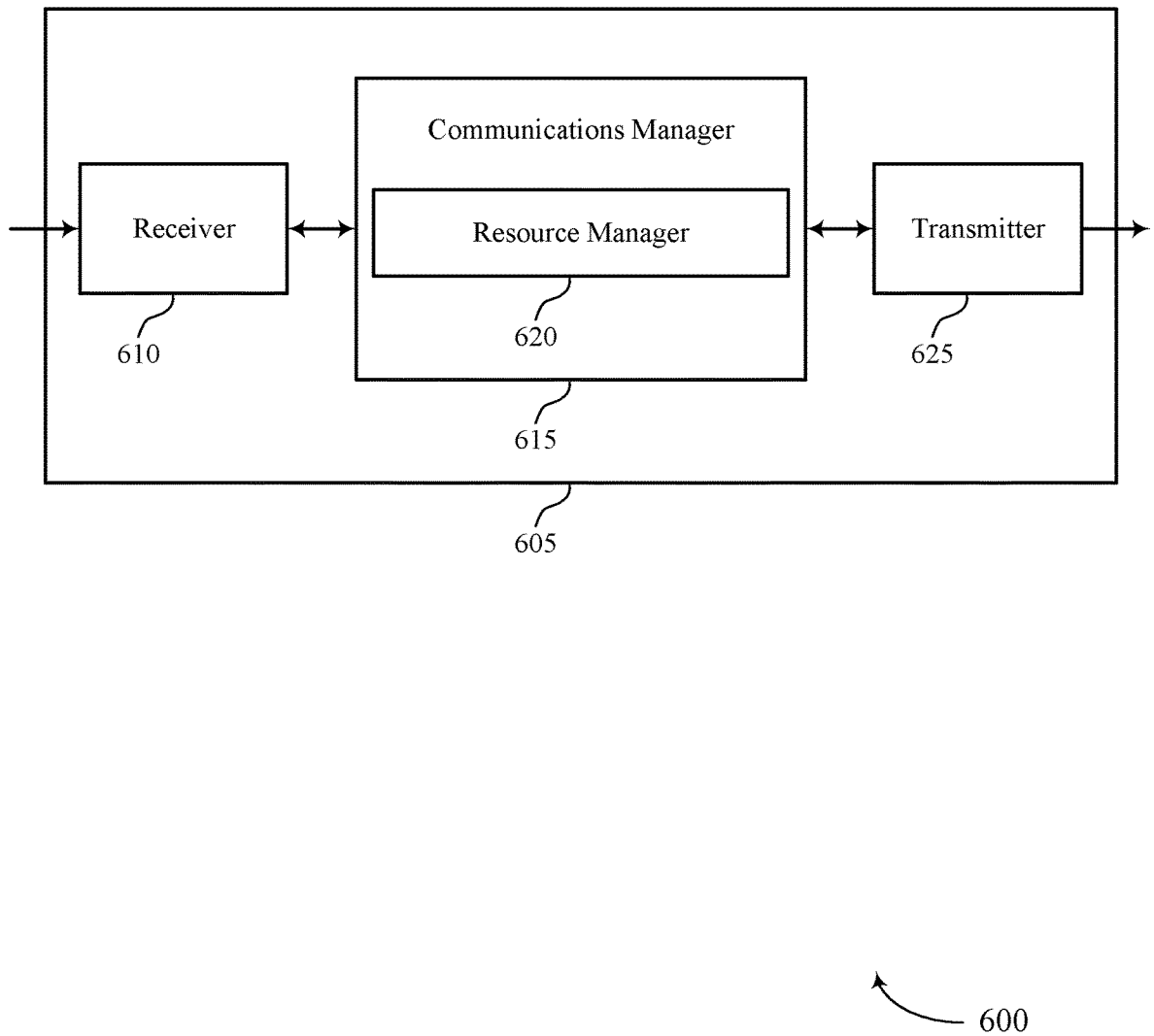
FIG. 6 shows a block diagram of a device that supports control and data multiplexing for resources in accordance with aspects of the present disclosure.

FIG. 6 shows a block diagram 600 of a device 605 that supports control and data multiplexing for resources in accordance with aspects of the present disclosure. The device 605 may be an example of aspects of a UE 115 as described herein. The device 605 may include a receiver 610, a communications manager 615, and a transmitter 625. The device 605 may also include a processor. Each of these components may be in communication with one another (e.g., via one or more buses).

The receiver 610 may receive information such as packets, user data, or control information associated with various information channels (e.g., control channels, data channels, and information related to control and data multiplexing for resources, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may include a resource manager 620. The communications manager 615 may be an example of aspects of the communications manager 810 described herein. In some examples, the communications manager 615, or its sub-components, may be combined or may use the receiver 610, the transmitter 625, or a combination thereof to perform the functions described herein.

The resource manager 620 may transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicate first data in a first one or more resources of the first set of shared resources after transmitting the request in the first control resource, receive, by the first UE in a second control resource of the first set of shared resources, one or more responses from one or more UEs after communicating the first data in the first one or more resources, and communicate second data in a second one or more resources of the first set of shared resources after receiving the one or more responses in the second control resource.

The communications manager 615 as described herein may be implemented to realize one or more potential advantages. One implementation may allow the device 605 to save power and increase battery life by communicating with UEs 115 (as shown in FIG. 1) more efficiently. For example, the device 605 may efficiently communicate with UEs 115 in peer-to-peer communications (e.g., sidelink communications), as the device 605 may be able to multiplex data transmissions and control signaling in order to reduce idle transmission time. The communications manager 615 may be an example of aspects of the communications manager 810 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. In some examples, the communications manager 615, or its sub-components, may be combined or may use the receiver 610, the transmitter 625, or a combination thereof to perform the functions described herein.

The transmitter 625 may transmit signals generated by other components of the device 605. In some examples, the transmitter 625 may be collocated with a receiver 610 in a transceiver module. For example, the transmitter 625 may be an example of aspects of the transceiver 820 described with reference to FIG. 8. The transmitter 625 may utilize a single antenna or a set of antennas.

Figure 7:
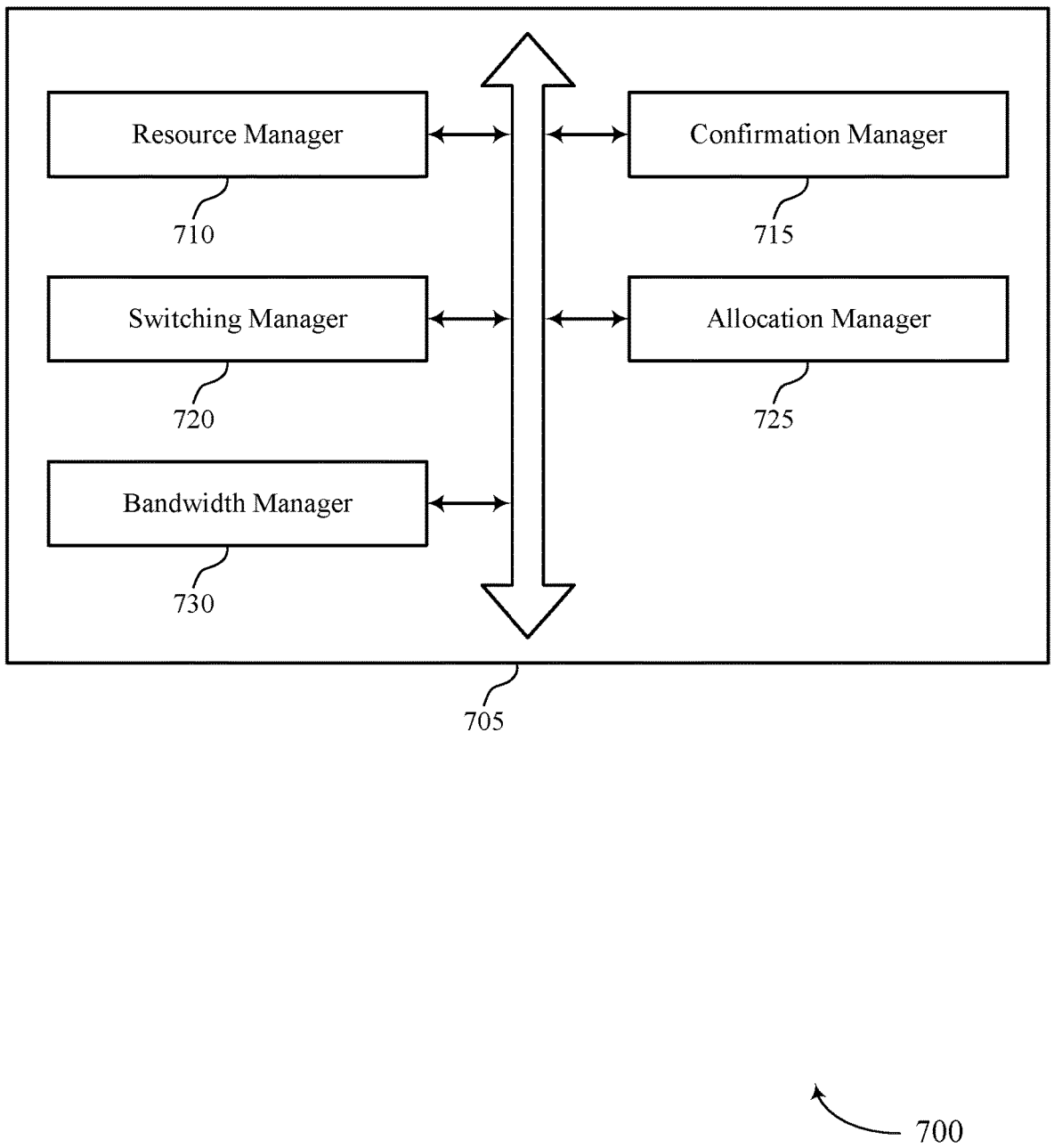
FIG. 7 shows a block diagram of a communications manager that supports control and data multiplexing for resources in accordance with aspects of the present disclosure.

FIG. 7 shows a block diagram 700 of a communications manager 705 that supports control and data multiplexing for resources in accordance with aspects of the present disclosure. The communications manager 705 may be an example of aspects of a communications manager 615, or a communications manager 810 described herein. The communications manager 705 may include a resource manager 710, a confirmation manager 715, a switching manager 720, an allocation manager 725, and a bandwidth manager 730. Each of these modules may communicate, directly or indirectly, with one another (e.g., via one or more buses).

The resource manager 710 may transmit, to a second UE in a first control resource of a first set of shared resources of a peer-to-peer network between a set of UEs, a request to reserve data resources of a second set of shared resources after the first set of shared resources, the second set of shared resources being associated with a second period of time occurring after a first period of time associated with the first set of shared resources. The resource manager 710 may communicate first data in a first one or more resources of the first set of shared resources after transmitting the request in the first control resource. The resource manager 710 may receive, by the first UE in a second control resource of the first set of shared resources, one or more responses from one or more UEs after communicating the first data in the first one or more resources. The resource manager 710 may communicate second data in a second one or more resources of the first set of shared resources after receiving the one or more responses in the second control resource.

In some cases, communicating the first data and the second data may be scheduled using one or more previous requests to reserve the data resources. In some cases, the first one or more resources and the second one or more resources may each include a same quantity of resources. In some cases, the one or more responses may indicate a positive response to the request, a negative response to the request, or both. In some cases, the first control resource may include a first slot and the first one or more resources may include a first one or more slots. In some cases, the peer-to-peer network may include a sidelink network for exchanging communications between the first UE and the second UE over one or more sidelink communication links.

In some cases, communicating the first data may include communicating the first data with the second UE. In some cases, communicating the first data may include communicating the first data with another UE of the set of UEs in the peer-to-peer network. In some cases, communicating the first data may include transmitting the first data to another UE of the set of UEs in the peer-to-peer network. In some cases, communicating the first data may include receiving the first data from another UE of the set of UEs in the peer-to-peer network. In some cases, the first data may be scheduled using a request in a previous set of shared resources in response to an earlier confirmation associated with an earlier request, the previous set of shared resources being associated with a third period of time occurring before the first period of time associated with the first set of shared resources.

The confirmation manager 715 may transmit, to the second UE in a third control resource of the first set of shared resources, a confirmation indicating a reservation of the data resources in the second set of shared resources after communicating the second data in the second one or more resources. In some examples, the confirmation manager 715 may communicate third data in a third one or more resources after transmitting the confirmation in the third control resource.

The switching manager 720 may identify a switch duration for transitioning from using a first set of communication parameters to using a second set of communication parameters to communicate over the peer-to-peer network, where communicating the first data in the first one or more resources is based on identifying the switch duration. In some examples, the switching manager 720 may refrain from communicating data or control information during a first duration corresponding to the switch duration in the first one or more resources, where communicating the first data in the first one or more resources is based on refraining from communicating during the first duration. In some examples, the switching manager 720 may refrain from communicating data or control information in a second duration corresponding to the switch duration in the first one or more resources after communicating the first data, where receiving the one or more responses in the second control resource is based on refraining from communicating during the second duration. In some examples, the switching manager 720 may refrain from communicating data or control information in a third duration corresponding to the switch duration in the second one or more resources, where communicating the second data after the third duration is based on refraining from communicating during the third duration. In some cases, the switch duration may be configured to allow the first UE to transition from receiving information to transmitting information, transition from transmitting information to receiving information, or adjust from first beam configuration parameters to second beam configuration parameters, or any combination thereof.

The allocation manager 725 may receive, from a base station, a message that indicates one or more resources in the first set of shared resources that are allocated as control resources of the first set of shared resources and used for reserving the data resources. In some cases, the message indicates a numerical quantity of UEs in the peer-to-peer network associated with the first set of shared resources, an index value for each UE in the peer-to-peer network, a size of the first set of shared resources, a starting resource of control resources within the first set of shared resources, or a combination thereof. In some examples, the allocation manager 725 may determine that the first control resource is allocated for sending the request by the first UE based on receiving the message, where transmitting the request in the first control resource is based on the determining that the first control resource is allocated for sending the request by the first UE.

In some examples, the allocation manager 725 may determine that a fourth control resource is allocated for sending a second request by a third UE based on receiving the message. In some examples, the allocation manager 725 may refrain, by the first UE, from communicating data in the fourth control resource based on determining that the fourth control resource is allocated for sending the second request.

The bandwidth manager 730 may transmit the request in a first frequency bandwidth. In some examples, the bandwidth manager 730 may communicate the first data and the second data in a second frequency bandwidth greater than the first frequency bandwidth.

Figure 8:
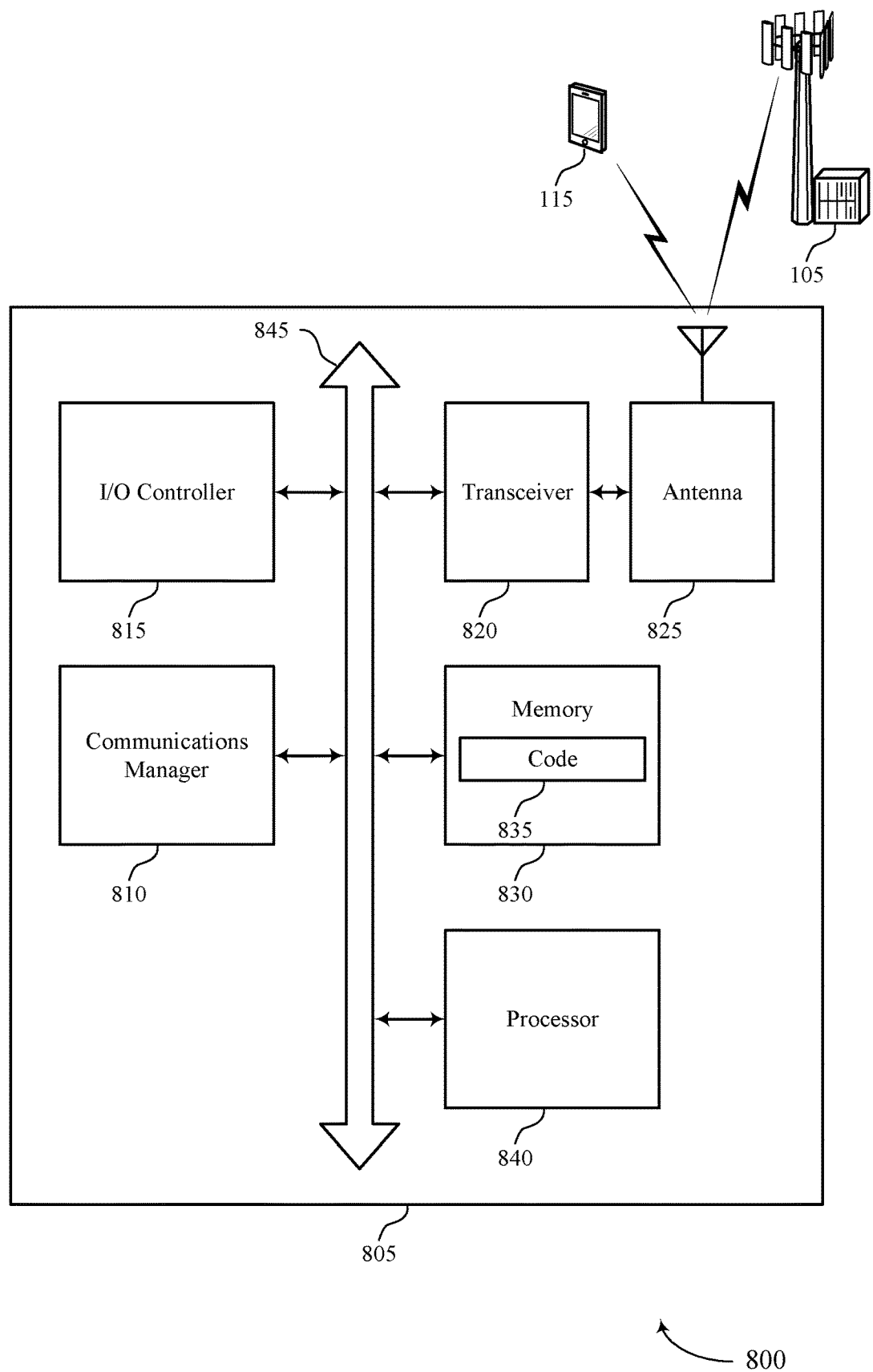
FIG. 8 shows a diagram of a system including a device that supports control and data multiplexing for resources in accordance with aspects of the present disclosure.

FIG. 8 shows a diagram of a system 800 including a device 805 that supports control and data multiplexing for resources in accordance with aspects of the present disclosure. The device 805 may be an example of or include the components of device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources, communicate first data in a first one or more resources of the first set of shared resources after transmitting the request in the first control resource, receive, by the first UE in a second control resource of the first set of shared resources, one or more responses from one or more UEs after communicating the first data in the first one or more resources, and communicate second data in a second one or more resources of the first set of shared resources after receiving the one or more responses in the second control resource.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting control and data multiplexing for resources).

The processor 840 of the device 805 (e.g., controlling the receiver 610, the transmitter 625, or the transceiver 820) may reduce power consumption and increase communications efficiency based on multiplexing data transmissions and control signaling. In some examples, the processor 840 of the device 805 may reconfigure parameters for communicating data and control information. For example, the processor 840 of the device 805 may turn on one or more processing units for adjusting communication parameters, increase a processing clock, or a similar mechanism within the device 805. As such, when subsequent data and control resource allocations are received, the processor 840 may be ready to respond more efficiently through the reduction of a ramp up in processing power. The improvements in power saving and system efficiency may further increase battery life at the device 805.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
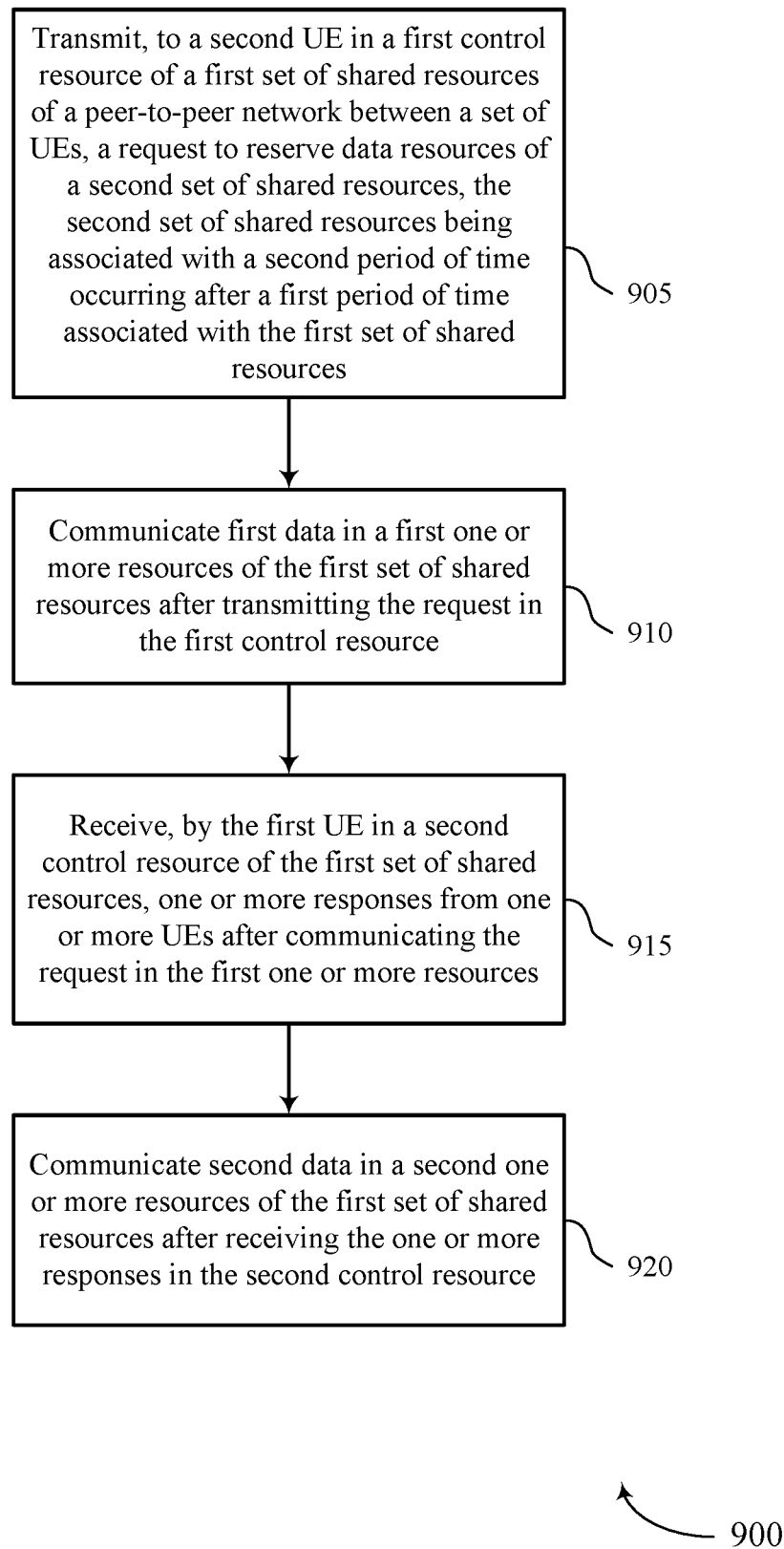
FIGS. 9 through 11 show flowcharts illustrating methods that support control and data multiplexing for resources in accordance with aspects of the present disclosure.

FIG. 9 shows a flowchart illustrating a method 900 that supports control and data multiplexing for resources in accordance with aspects of the present disclosure. The operations of method 900 may be implemented by a UE 115 or its components as described herein. For example, the operations of method 900 may be performed by a communications manager as described with reference to FIGS. 6 through 8. In some examples, a UE may execute a set of instructions to control the functional elements of the UE to perform the functions described below. Additionally or alternatively, a UE may perform aspects of the functions described below using special-purpose hardware.

At 905, the UE may transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources. The operations of 905 may be performed according to the methods described herein. In some examples, aspects of the operations of 905 may be performed by a resource manager as described with reference to FIGS. 6 through 8.

At 910, the UE may communicate first data in a first one or more resources of the first set of shared resources after transmitting the request in the first control resource. The operations of 910 may be performed according to the methods described herein. In some examples, aspects of the operations of 910 may be performed by a resource manager as described with reference to FIGS. 6 through 8.

At 915, the UE may receive, by the first UE in a second control resource of the first set of shared resources, one or more responses from one or more UEs after communicating the first data in the first one or more resources. The operations of 915 may be performed according to the methods described herein. In some examples, aspects of the operations of 915 may be performed by a resource manager as described with reference to FIGS. 6 through 8.

At 920, the UE may communicate second data in a second one or more resources of the first set of shared resources after receiving the one or more responses in the second control resource. The operations of 920 may be performed according to the methods described herein. In some examples, aspects of the operations of 920 may be performed by a resource manager as described with reference to FIGS. 6 through 8.

Figure 10:
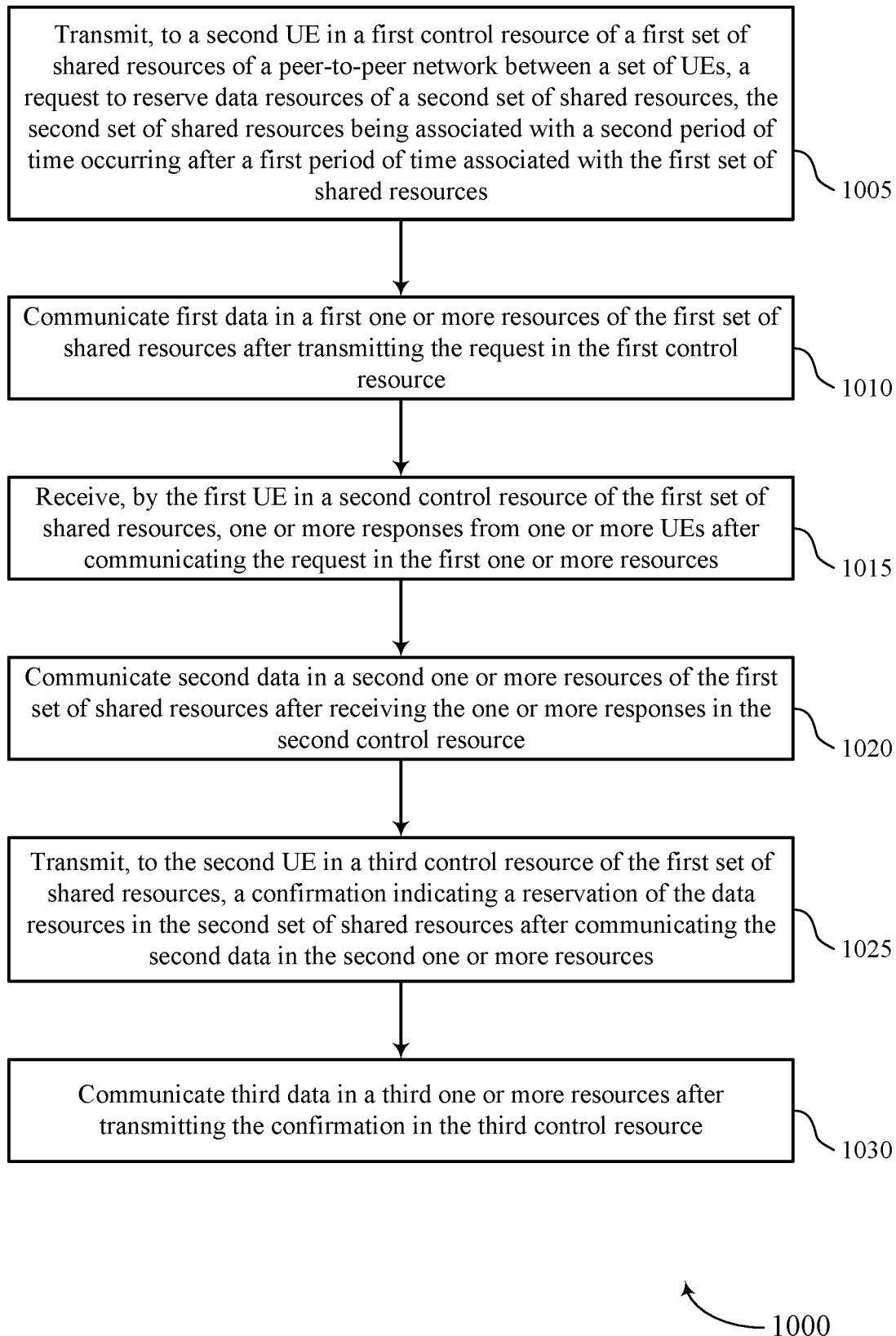

FIG. 10 shows a flowchart illustrating a method 1000 that supports control and data multiplexing for resources in accordance with aspects of the present disclosure. The operations of method 1000 may be implemented by a UE 115 or its components as described herein. For example, the operations of method 1000 may be performed by a communications manager as described with reference to FIGS. 6 through 8. In some examples, a UE may execute a set of instructions to control the functional elements of the UE to perform the functions described below. Additionally or alternatively, a UE may perform aspects of the functions described below using special-purpose hardware.

At 1005, the UE may transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources. The operations of 1005 may be performed according to the methods described herein. In some examples, aspects of the operations of 1005 may be performed by a resource manager as described with reference to FIGS. 6 through 8.

At 1010, the UE may communicate first data in a first one or more resources of the first set of shared resources after transmitting the request in the first control resource. The operations of 1010 may be performed according to the methods described herein. In some examples, aspects of the operations of 1010 may be performed by a resource manager as described with reference to FIGS. 6 through 8.

At 1015, the UE may receive, by the first UE in a second control resource of the first set of shared resources, one or more responses from one or more UEs after communicating the first data in the first one or more resources. The operations of 1015 may be performed according to the methods described herein. In some examples, aspects of the operations of 1015 may be performed by a resource manager as described with reference to FIGS. 6 through 8.

At 1020, the UE may communicate second data in a second one or more resources of the first set of shared resources after receiving the one or more responses in the second control resource. The operations of 1020 may be performed according to the methods described herein. In some examples, aspects of the operations of 1020 may be performed by a resource manager as described with reference to FIGS. 6 through 8.

At 1025, the UE may transmit, to the second UE in a third control resource of the first set of shared resources, a confirmation indicating a reservation of the data resources in the second set of shared resources after communicating the second data in the second one or more resources. The operations of 1025 may be performed according to the methods described herein. In some examples, aspects of the operations of 1025 may be performed by a confirmation manager as described with reference to FIGS. 6 through 8.

At 1030, the UE may communicate third data in a third one or more resources after transmitting the confirmation in the third control resource. The operations of 1030 may be performed according to the methods described herein. In some examples, aspects of the operations of 1030 may be performed by a confirmation manager as described with reference to FIGS. 6 through 8.

Figure 11:
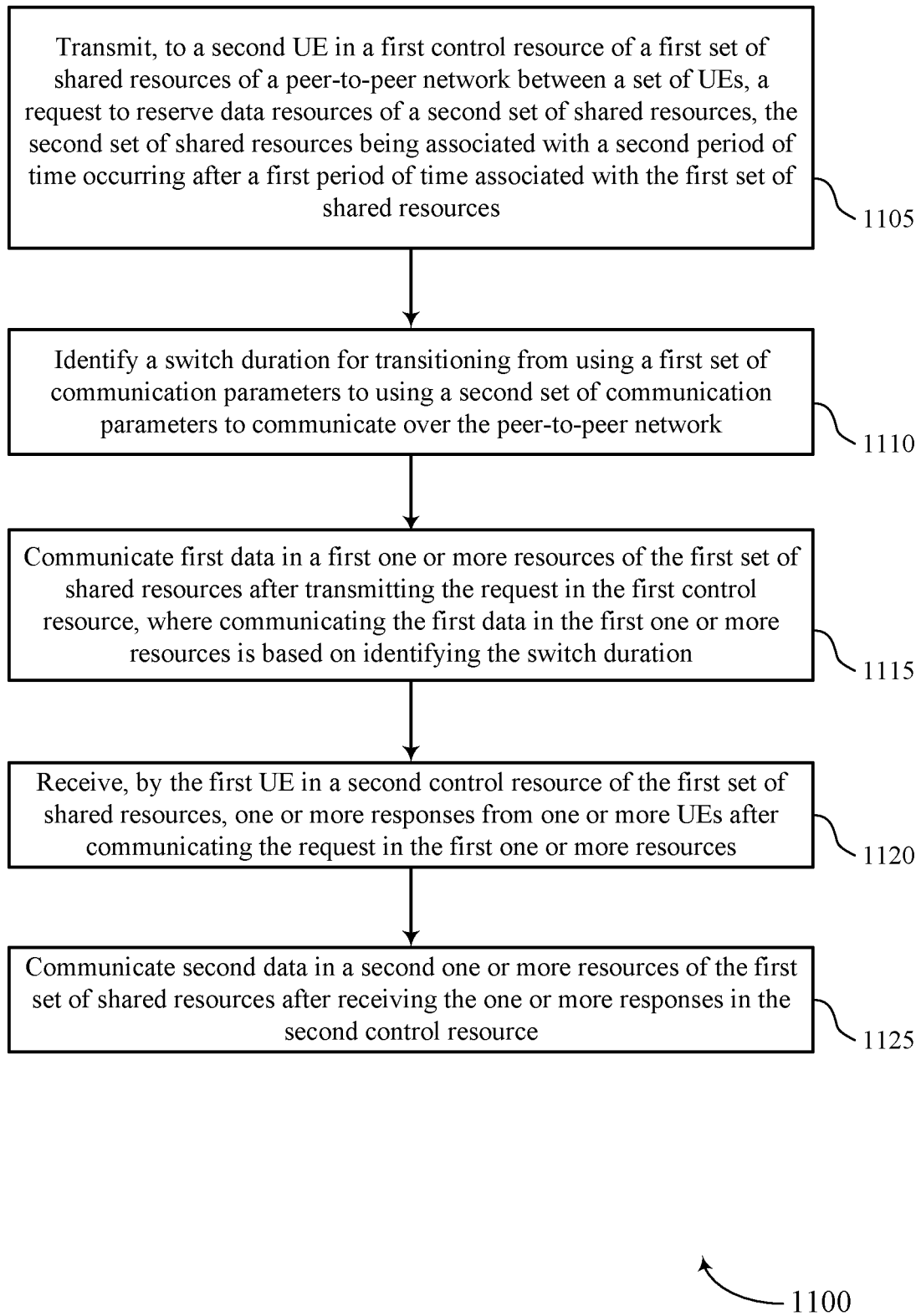

FIG. 11 shows a flowchart illustrating a method 1100 that supports control and data multiplexing for resources in accordance with aspects of the present disclosure. The operations of method 1100 may be implemented by a UE 115 or its components as described herein. For example, the operations of method 1100 may be performed by a communications manager as described with reference to FIGS. 6 through 8. In some examples, a UE may execute a set of instructions to control the functional elements of the UE to perform the functions described below. Additionally or alternatively, a UE may perform aspects of the functions described below using special-purpose hardware.

At 1105, the UE may transmit, to a second UE in a first control resource of a first set of shared resources of a peer-to-peer network between a set of UEs, a request to reserve data resources of a second set of shared resources, the second set of shared resources being associated with a second period of time occurring after a first period of time associated with the first set of shared resources. The operations of 1105 may be performed according to the methods described herein. In some examples, aspects of the operations of 1105 may be performed by a resource manager as described with reference to FIGS. 6 through 8.

At 1110, the UE may identify a switch duration for transitioning from using a first set of communication parameters to using a second set of communication parameters to communicate over the peer-to-peer network. The operations of 1110 may be performed according to the methods described herein. In some examples, aspects of the operations of 1110 may be performed by a switching manager as described with reference to FIGS. 6 through 8.

At 1115, the UE may communicate first data in a first one or more resources of the first set of shared resources after transmitting the request in the first control resource, where communicating the first data in the first one or more resources is based on identifying the switch duration. The operations of 1115 may be performed according to the methods described herein. In some examples, aspects of the operations of 1115 may be performed by a resource manager as described with reference to FIGS. 6 through 8.

At 1120, the UE may receive, by the first UE in a second control resource of the first set of shared resources, one or more responses from one or more UEs after communicating the first data in the first one or more resources. The operations of 1120 may be performed according to the methods described herein. In some examples, aspects of the operations of 1120 may be performed by a resource manager as described with reference to FIGS. 6 through 8.

At 1125, the UE may communicate second data in a second one or more resources of the first set of shared resources after receiving the one or more responses in the second control resource. The operations of 1125 may be performed according to the methods described herein. In some examples, aspects of the operations of 1125 may be performed by a resource manager as described with reference to FIGS. 6 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: transmitting, to a second UE in a first control resource of a first set of shared resources of a peer-to-peer network between a plurality of UEs, a request to reserve data resources of a second set of shared resources, the second set of shared resources being associated with a second period of time occurring after a first period of time associated with the first set of shared resources; communicating first data in a first one or more resources of the first set of shared resources after the transmitting of the request in the first control resource; receiving, by the first UE in a second control resource of the first set of shared resources, one or more responses from one or more UEs after the communicating of the first data in the first one or more resources; and communicating second data in a second one or more resources of the first set of shared resources after the receiving of the one or more responses in the second control resource.

Aspect 2: The method of aspect 1, further comprising: transmitting, to the second UE in a third control resource of the first set of shared resources, a confirmation indicating a reservation of the data resources in the second set of shared resources after the communicating of the second data in the second one or more resources; and communicating third data in a third one or more resources after the transmitting of the confirmation in the third control resource.

Aspect 3: The method of any of aspects 1 through 2, further comprising: identifying a switch duration for transitioning from using a first set of communication parameters to using a second set of communication parameters to communicate over the peer-to-peer network, wherein the communicating of the first data in the first one or more resources is based at least in part on the identifying of the switch duration.

Aspect 4: The method of aspect 3, further comprising: refraining from communicating data or control information during a first duration corresponding to the switch duration in the first one or more resources, wherein the communicating of the first data in the first one or more resources is based at least in part on the refraining from communicating during the first duration.

Aspect 5: The method of aspect 4, further comprising: refraining from communicating data or control information in a second duration corresponding to the switch duration in the first one or more resources after the communicating of the first data, wherein the receiving of the one or more responses in the second control resource is based at least in part on the refraining from communicating during the second duration.

Aspect 6: The method of any of aspects 3 through 5, further comprising: refraining from communicating data or control information in a third duration corresponding to the switch duration in the second one or more resources, wherein the communicating of the second data after the third duration is based at least in part on the refraining from communicating during the third duration.

Aspect 7: The method of any of aspects 3 through 6, wherein the switch duration is configured to allow the first UE to transition from receiving information to transmitting information, transition from transmitting information to receiving information, or adjust from first beam configuration parameters to second beam configuration parameters, or any combination thereof.

Aspect 8: The method of any of aspects 1 through 7, further comprising: receiving, from a base station, a message that indicates one or more resources in the first set of shared resources that are allocated as control resources of the first set of shared resources and used for reserving the data resources.

Aspect 9: The method of aspect 8, further comprising: determining that the first control resource is allocated for sending the request by the first UE based at least in part on receiving the message, wherein the transmitting of the request in the first control resource is based at least in part on the determining that the first control resource is allocated for sending the request by the first UE.

Aspect 10: The method of any of aspects 8 through 9, further comprising: determining that a fourth control resource is allocated for sending a second request by a third UE based at least in part on receiving the message; and refraining, by the first UE, from communicating data in the fourth control resource based at least in part on the determining that the fourth control resource is allocated for sending the second request.

Aspect 11: The method of any of aspects 8 through 10, wherein the message indicates a numerical quantity of UEs in the peer-to-peer network associated with the first set of shared resources, an index value for each UE in the peer-to-peer network, a size of the first set of shared resources, a starting resource of control resources within the first set of shared resources, or a combination thereof.

Aspect 12: The method of any of aspects 1 through 11, wherein the communicating of the first data and the second data is scheduled using one or more previous requests to reserve the data resources.

Aspect 13: The method of any of aspects 1 through 12, wherein the communicating of the first data comprises: communicating the first data with the second UE.

Aspect 14: The method of any of aspects 1 through 12, wherein the communicating of the first data comprises: communicating the first data with another UE of the plurality of UEs in the peer-to-peer network.

Aspect 15: The method of any of aspects 1 through 12, wherein the communicating of the first data comprises: transmitting the first data to another UE of the plurality of UEs in the peer-to-peer network.

Aspect 16: The method of any of aspects 1 through 12, wherein the communicating of the first data comprises: receiving the first data from another UE of the plurality of UEs in the peer-to-peer network.

Aspect 17: The method of any of aspects 1 through 16, wherein the first data is scheduled using a second request in a previous set of shared resources in response to an earlier confirmation associated with an earlier request, the previous set of shared resources being associated with a third period of time occurring before the first period of time associated with the first set of shared resources.

Aspect 18: The method of any of aspects 1 through 17, further comprising: transmitting the request in a first frequency bandwidth; and communicating the first data and the second data in a second frequency bandwidth greater than the first frequency bandwidth.

Aspect 19: The method of any of aspects 1 through 18, wherein the first one or more resources and the second one or more resources each comprise a same quantity of resources.

Aspect 20: The method of any of aspects 1 through 19, wherein the one or more responses indicate a positive response to the request, a negative response to the request, or both.

Aspect 21: The method of any of aspects 1 through 20, wherein the first control resource comprises a first slot and the first one or more resources comprises a first one or more slots.

Aspect 22: The method of any of aspects 1 through 21, wherein the peer-to-peer network comprises a sidelink network for exchanging communications between the first UE and the second UE over one or more sidelink communication links.

Aspect 23: An apparatus for wireless communications at a first UE, comprising a processor; memory coupled with the processor; and instructions stored in the memory and executable by the processor to cause the apparatus to perform a method of any of aspects 1 through 22.

Aspect 24: An apparatus for wireless communications at a first UE, comprising at least one means for performing a method of any of aspects 1 through 22.

Aspect 25: A non-transitory computer-readable medium storing code for wireless communications at a first UE, the code comprising instructions executable by a processor to perform a method of any of aspects 1 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   transmitting, to a second UE in a first control resource of a first set of shared resources of a peer-to-peer network between a plurality of UEs, a request to reserve data resources of a second set of shared resources, the second set of shared resources being associated with a second period of time occurring after a first period of time associated with the first set of shared resources;
   communicating first data in a first one or more resources of the first set of shared resources after the transmitting of the request in the first control resource, wherein the communicating of the first data is based at least in part on one or more previous requests to reserve the first one or more resources of the first set of shared resources;
   receiving, by the first UE in a second control resource and during the first period of time associated with the first set of shared resources, one or more responses from one or more UEs after the communicating of the first data in the first one or more resources, wherein the one or more responses are received in response to the request to reserve the data resources of the second set of shared resources; and
   communicating second data in a second one or more resources of the first set of shared resources after the receiving of the one or more responses in the second control resource, wherein the communicating of the second data is based at least in part on one or more previous requests to reserve the second one or more resources of the first set of shared resources.

2. The method of claim 1, further comprising:
   transmitting, to the second UE in a third control resource of the first set of shared resources, a confirmation indicating a reservation of the data resources in the second set of shared resources after the communicating of the second data in the second one or more resources; and
   communicating third data in a third one or more resources after the transmitting of the confirmation in the third control resource.

3. The method of claim 1, further comprising:
   identifying a switch duration for transitioning from using a first set of communication parameters to using a second set of communication parameters to communicate over the peer-to-peer network, wherein the communicating of the first data in the first one or more resources is based at least in part on the identifying of the switch duration.

4. The method of claim 3, further comprising:
   refraining from communicating data or control information during a first duration corresponding to the switch duration in the first one or more resources, wherein the communicating of the first data in the first one or more resources is based at least in part on the refraining from communicating during the first duration.

5. The method of claim 4, further comprising:
   refraining from communicating data or control information in a second duration corresponding to the switch duration in the first one or more resources after the communicating of the first data, wherein the receiving of the one or more responses in the second control resource is based at least in part on the refraining from communicating during the second duration.

6. The method of claim 3, further comprising:
   refraining from communicating data or control information in a third duration corresponding to the switch duration in the second one or more resources, wherein the communicating of the second data after the third duration is based at least in part on the refraining from communicating during the third duration.

7. The method of claim 3, wherein the switch duration is configured to allow the first UE to transition from receiving information to transmitting information, transition from transmitting information to receiving information, or adjust from first beam configuration parameters to second beam configuration parameters, or any combination thereof.

8. The method of claim 1, further comprising:
   receiving, from a network device, a message that indicates one or more resources in the first set of shared resources that are allocated as control resources of the first set of shared resources and used for reserving the data resources.

9. The method of claim 8, further comprising:
   determining that the first control resource is allocated for sending the request by the first UE based at least in part on receiving the message, wherein the transmitting of the request in the first control resource is based at least in part on the determining that the first control resource is allocated for sending the request by the first UE.

10. The method of claim 8, further comprising:
    determining that a fourth control resource is allocated for sending a second request by a third UE based at least in part on receiving the message; and
    refraining, by the first UE, from communicating data in the fourth control resource based at least in part on the determining that the fourth control resource is allocated for sending the second request.

11. The method of claim 8, wherein the message indicates a numerical quantity of UEs in the peer-to-peer network associated with the first set of shared resources, an index value for each UE in the peer-to-peer network, a size of the first set of shared resources, a starting resource of control resources within the first set of shared resources, or a combination thereof.

12. The method of claim 1, wherein the communicating of the first data and the second data is scheduled using the one or more previous requests to reserve the first one or more resources and using the one or more previous requests to reserve the second one or more resources, respectively.

13. The method of claim 1, wherein the communicating of the first data comprises:
communicating the first data with the second UE.

14. The method of claim 1, wherein the communicating of the first data comprises:
communicating the first data with another UE of the plurality of UEs in the peer-to-peer network.

15. The method of claim 1, wherein the communicating of the first data comprises:
transmitting the first data to another UE of the plurality of UEs in the peer-to-peer network.

16. The method of claim 1, wherein the communicating of the first data comprises:
receiving the first data from another UE of the plurality of UEs in the peer-to-peer network.

17. The method of claim 1, wherein the first data is scheduled using a second request in a previous set of shared resources in response to an earlier confirmation associated with an earlier request, the previous set of shared resources being associated with a third period of time occurring before the first period of time associated with the first set of shared resources.

18. The method of claim 1, further comprising:
transmitting the request in a first frequency bandwidth; and
communicating the first data and the second data in a second frequency bandwidth greater than the first frequency bandwidth.

19. The method of claim 1, wherein the first one or more resources and the second one or more resources each comprise a same quantity of resources.

20. The method of claim 1, wherein the one or more responses indicate a positive response to the request, a negative response to the request, or both.

21. The method of claim 1, wherein the first control resource comprises a first slot and the first one or more resources comprises a first one or more slots.

22. The method of claim 1, wherein the peer-to-peer network comprises a sidelink network for exchanging communications between the first UE and the second UE over one or more sidelink communication links.

23. An apparatus for wireless communications at a first user equipment (UE), comprising:
a processor;
memory coupled with the processor; and
instructions stored in the memory and operable, when executed by the processor, to cause the apparatus to:
transmit, to a second UE in a first control resource of a first set of shared resources of a peer-to-peer network between a plurality of UEs, a request to reserve data resources of a second set of shared resources after the first set of shared resources, the second set of shared resources being associated with a second period of time occurring after a first period of time associated with the first set of shared resources;
communicate first data in a first one or more resources of the first set of shared resources after transmitting the request in the first control resource, wherein the communicating of the first data is based at least in part on one or more previous requests to reserve the first one or more resources of the first set of shared resources;
receive, by the first UE in a second control resource and during the first period of time associated with the first set of shared resources, one or more responses from one or more UEs after communicating the first data in the first one or more resources, wherein the one or more responses are received in response to the request to reserve the data resources of the second set of shared resources; and
communicate second data in a second one or more resources of the first set of shared resources after receiving the one or more responses in the second control resource, wherein the communicating of the second data is based at least in part on one or more previous requests to reserve the second one or more resources of the first set of shared resources.

24. The apparatus of claim 23, wherein the instructions are further executable by the processor to cause the apparatus to:
transmit, to the second UE in a third control resource of the first set of shared resources, a confirmation indicating a reservation of the data resources in the second set of shared resources after communicating the second data in the second one or more resources; and
communicate third data in a third one or more resources after transmitting the confirmation in the third control resource.

25. The apparatus of claim 23, wherein the instructions are further executable by the processor to cause the apparatus to:
identify a switch duration for transitioning from using a first set of communication parameters to using a second set of communication parameters to communicate over the peer-to-peer network, wherein communicating the first data in the first one or more resources is based at least in part on identifying the switch duration.

26. The apparatus of claim 23, wherein the instructions are further executable by the processor to cause the apparatus to:
receive, from a network device, a message that indicates one or more resources in the first set of shared resources that are allocated as control resources of the first set of shared resources and used for reserving the data resources.

27. The apparatus of claim 23, wherein communicating the first data and the second data is scheduled using the one or more previous requests to reserve the first one or more resources and using the one or more previous requests to reserve the second one or more resources, respectively.

28. The apparatus of claim 23, wherein communicating the first data comprises communicating the first data with the second UE.

29. An apparatus for wireless communications at a first user equipment (UE), comprising:
means for transmitting, to a second UE in a first control resource of a first set of shared resources of a peer-to-peer network between a plurality of UEs, a request to reserve data resources of a second set of shared resources, the second set of shared resources being associated with a second period of time occurring after a first period of time associated with the first set of shared resources;
means for communicating first data in a first one or more resources of the first set of shared resources after transmitting the request in the first control resource, wherein the communicating of the first data is based at least in part on one or more previous requests to reserve the first one or more resources of the first set of shared resources;
means for receiving, by the first UE in a second control resource and during the first period of time associated with the first set of shared resources, one or more responses from one or more UEs after communicating the first data in the first one or more resources, wherein the one or more responses are received in response to the request to reserve the data resources of the second set of shared resources; and means for communicating second data in a second one or more resources of the first set of shared resources after receiving the one or more responses in the second control resource, wherein the communicating of the second data is based at least in part on one or more previous requests to reserve the second one or more resources of the first set of shared resources.

30. A non-transitory computer-readable medium storing code for wireless communications at a first user equipment (UE), the code comprising instructions executable by a processor to:

transmit, to a second UE in a first control resource of a first set of shared resources of a peer-to-peer network between a plurality of UEs, a request to reserve data resources of a second set of shared resources, the second set of shared resources being associated with a second period of time occurring after a first period of time associated with the first set of shared resources;

communicate first data in a first one or more resources of the first set of shared resources after transmitting the request in the first control resource, wherein the communicating of the first data is based at least in part on one or more previous requests to reserve the first one or more resources of the first set of shared resources;

receive, by the first UE in a second control resource and during the first period of time associated with the first set of shared resources, one or more responses from one or more UEs after communicating the first data in the first one or more resources, wherein the one or more responses are received in response to the request to reserve the data resources of the second set of shared resources; and communicate second data in a second one or more resources of the first set of shared resources after receiving the one or more responses in the second control resource, wherein the communicating of the second data is based at least in part on one or more previous requests to reserve the second one or more resources of the first set of shared resources.

* * * * *